(12) United States Patent
Shankar et al.

(10) Patent No.: US 7,590,648 B2
(45) Date of Patent: Sep. 15, 2009

(54) TEMPLATE-BASED DEVELOPMENT OF SERVERS

(75) Inventors: Vinod R. Shankar, Redmond, WA (US); Peter H. Benoit, Kirkland, WA (US); Xinhong (Henry) Zhang, Bothell, WA (US); Eric Lindvall, Seattle, WA (US)

(73) Assignee: Brocade Communications Systems, Inc., San Jose, CA (US)

( * ) Notice: Subject to any disclaimer, the term of this patent is extended or adjusted under 35 U.S.C. 154(b) by 457 days.

(21) Appl. No.: 11/140,577

(22) Filed: May 27, 2005

(65) Prior Publication Data

US 2006/0155749 A1 Jul. 13, 2006

Related U.S. Application Data

(60) Provisional application No. 60/639,854, filed on Dec. 27, 2004.

(51) Int. Cl.
*G06F 17/30* (2006.01)
(52) U.S. Cl. ......................................... 707/102; 707/10
(58) Field of Classification Search ................. 707/100, 707/101, 102, 200, 201, 205
See application file for complete search history.

(56) References Cited

U.S. PATENT DOCUMENTS

| | | | | |
|---|---|---|---|---|
| 5,990,892 A * | 11/1999 | Urbain | ....................... | 715/853 |
| 6,690,400 B1 * | 2/2004 | Moayyad et al. | ............. | 715/779 |
| 7,055,014 B1 * | 5/2006 | Pawlowski et al. | .......... | 711/202 |
| 7,159,093 B2 * | 1/2007 | Dalal et al. | .................. | 711/170 |
| 7,194,695 B1 * | 3/2007 | Racine et al. | ................ | 715/780 |
| 7,200,530 B2 * | 4/2007 | Brown et al. | .................... | 703/1 |
| 2003/0135609 A1 * | 7/2003 | Carlson et al. | .............. | 709/224 |
| 2004/0268298 A1 * | 12/2004 | Miller et al. | ................. | 717/106 |
| 2006/0031447 A1 * | 2/2006 | Holt et al. | .................... | 709/223 |
| 2006/0279628 A1 * | 12/2006 | Fleming | ...................... | 348/143 |

* cited by examiner

*Primary Examiner*—Pierre M Vital
*Assistant Examiner*—Loan T Nguyen
(74) *Attorney, Agent, or Firm*—Wong, Cabello, Lutsch, Rutherford & Brucculeri, LLP

(57) ABSTRACT

A server instance, which is a collection of LUNs, containing an operating system, any applications and data storage. A processing element is the physical hardware. The combination is a server as normally understood. Templates are used to define server instances and server types to simplify deploying a server instance to a processing element. A graphical user interface provides the templates where the particular storage groups are identified and then server instances are created from lists of operating systems, applications, and available storage. The management service processor is a PXE server and provides the necessary software to identify the components of the processing element and correlate between the processing element and a server instance. The management service processor then automatically provides software to the processing element to allow it correctly boot. The management service processor manages the interconnection of the processing element and the relevant LUNs.

16 Claims, 29 Drawing Sheets

New Server Template

Create a new Server Template. Click Apply to make the changes permanent.

General

*Template Name: Win2003 — 1000
*OS Installation Type: SCRIPT — 1002
*OS Installation Name: Microsoft Windows 2003 Enter... — 1004
*OS Configuration File: Win2003-Unattend — 1006
*Storage Template: Test — 1008

[Optional Accounting Information]

Department: SQA
Location: SJ

OS Storage Allocation

| Size (MB) | Layout | Cost |
|---|---|---|
| 6000 | ANY | LOW |

— 1010   — 1012

Apply

Server Selection

Please select the Server to deploy from the table below.

| Name | Image Name | Operating System |
|---|---|---|
| HPBL20 | Microsoft Windows | Microsoft Windows |
| Exchange04 | Exchange Server 2003 | Microsoft Windows 2003 |
| Oracle12 | Oracle 10 on Windows | Microsoft Windows 2003 |
| LegalFS | Linux File Server | Linux |
| Web01 | Apache | Linux |

TEMPLATE-BASED DEVELOPMENT OF SERVERS

CROSS REFERENCE TO RELATED APPLICATIONS

This application claims the benefit of priority under 35 U.S.C. § 119(e) of U.S. Provisional Patent Application 60/639,854, entitled "Computer System Persistent State Management and Instruction," filed Dec. 27, 2004, which is hereby incorporated by reference.

This application is related to U.S. patent applications Ser. Nos. 11/140,252 entitled "Use of Server Instances and Processing Elements to Define a Server" and 11/140,543 entitled "Automated Deployment of Operating System and Data Space to a Server", filed concurrently herewith and hereby incorporated by reference.

BACKGROUND OF THE INVENTION

1. Field of the Inventions

The invention relates to management of computer system and, more particular, to instantiations and state management of computer servers and systems.

2. Description of the Related Art

A computer system is commonly comprised of two primary components: (1) a processing element that includes temporary random memory, one or more computer processing units (CPU), and input/output (I/O) capabilities; and (2) persistent storage, typically implemented as a hard disk drive generally referred to as "disk drives" or simply as "disks." One example is a server with its related storage. A computer system's storage is generally classified into two types: (1) program codes that contain the programming instructions executed by its CPU that is, the operating system and applications that use that operating system; and (2) persistent storage needed by the operating system and applications, such as e-mail storage, websites and database systems.

This simplified description illustrates that a computer system typically needs all of these parts to act together at one time. The persistent copy of the operating system and applications define what a computer system does and how it does it. For example, the operating system and applications might be a web server application presenting an on-line store. The persistent storage used by those applications, in turn, will determine the identity of the store, such as whether the on-line store is a luxury retailer or a wholesale supply house, and its inventory and pricing.

Previously, the processing elements and disk subsystems were typically bound closely together. This was determined primarily by the need to cost effectively access disks with good performance from the processing system. This style of connecting storage to processor is generally known as directly attached storage. An implication of this interconnect style is that an entire system would run a single set of applications on a particular operating system with a particular data set. Examples of such systems are the desktop computers and servers that will be familiar to those skilled in the art.

Currently there are much more flexible techniques for connecting computer storage and processors. Many of the storage devices can be accessed by many processing systems through a network. Systems that present block level disk devices across the network are generally known as storage area networks (SANs). These SAN implementations have become increasingly common since the late 1990s. Prior to that, storage would typically be made available over networks using relatively high level file or database access protocols. When the dedicated servers or appliances are used as file servers, that approach is often referred as network attached storage (NAS).

The block level or SAN approach is typically the more flexible and higher performance approach. One reason SANs are more flexible is because computer systems are constructed to start-up, or boot, in a series of steps. The earlier steps in the boot sequence usually only deal with block level devices. In the later steps where the operating system is loaded onto the processing element, the operating system itself will generally define its own preferred structures, such as a file or database system, on a block level device.

Installing the persistent copy of the operating system on a processing element can be a rather complicated process that is labor-intensive and typically requires specialized computer system expertise. This is complicated by current computing environments. For example, servers today are commonly available in what are called blade or rack environments. In a rack environment, a series of thin servers are located in a rack. In a blade environment, a series of processing elements on individual blades are contained in a chassis, with a rack often containing multiple chassis. The high density leads to great physical management issues, particularly if a system fails. Further, if direct attached storage is used on each of these systems, the available storage space may be limited and the management issues are greatly increased as disk drives are a high failure item. In addition to the physical management issues, the logical management issues are also very complicated. When there may be hundreds of these servers either in blade or rack format, keeping track of applications assigned to each server becomes formidable.

While SANs are very flexible in providing a great deal of high-performance storage, actually managing and interconnecting the servers and storage units can be a relatively complicated operation. Zones need to be properly arranged, LUNs (Logical Unit Numbers) need to be properly organized and defined and so on. In a larger environment there could be hundreds of servers as noted above, and literally thousands of LUNs available from the various storage devices, all on different portions of the SAN. The mapping between the various items can be horribly complex and very difficult and time consuming. Further, it can be highly error prone. Therefore methods and techniques to develop and simplify the management and deployment of servers and related storage, especially in enterprise environments, are highly desirable.

SUMMARY OF THE PRESENT INVENTION

Embodiments according to the present invention utilize three concepts. The first concept is that a server is defined as a server instance, which is a collection of LUNs, with one of the LUNs containing an operating system, one LUN preferably containing any applications and various LUNs containing the required data storage. The next concept is that a processing element is really just the physical hardware of the relevant server. The combination of a server instance and a processing element is then a server as normally understood. A third concept is that templates are used to define the server instances and server types so that deploying a server instance to a particular processing element is simplified.

The basic components of systems according to the present invention include a management service processor which maintains a database of the various items which are present and oversees development and deployment of the particular processing elements and the particular server instances. The management service processor interfaces with an administrator via a graphical user interface in most instances. The graphical user interface provides a series of templates, such as storage and server templates, where the particular storage groups are identified and then server instances are created by having drop-down lists of operating systems, applications, and available storage as required. Preferably the management service processor operates as a PXE, or preboot execution environment, server so that when a processing element is activated, the management service processor responds and provides the necessary software to the processing element to identify the components of the processing element and then to properly correlate between the processing element and a server instance as indicated by an administrator. The management service processor then automatically provides software to the processing element to allow it to correctly boot as desired by the administrator. In a preferred embodiment, this is booting over a SAN with the operating system, application and data volumes all located on storage units in the SAN. In other embodiments the server instance can be provided over either a LAN or a SAN to direct attached storage of the processing element. In the SAN boot case, the various caching files can be located in a direct attached mode on the particular processing element or in a storage unit on the SAN.

The management service processor manages the interconnection of the processing element and the relevant LUNs by properly assigning zoning information to the switches in the SAN fabric to allow the particular processing element to securely and correctly contact its appropriate storage units. The storage devices are preferably programmed to appear as desired for access by the processing element. In certain embodiments this can be done directly with the storage units and in other cases a virtualization device is utilized as an interface between the processing elements and the storage units to perform this mapping function.

With these techniques and the use of templates, it is also easy to transfer a server instance to a different physical element should the original physical element fail for some reason or if a higher performance unit is needed.

Because control of the operating system and application instances are under control of the management service processor, operating system and application license management is readily performed using the management service processor as the central control point. This provides further simplification for the administrative duties of managing the entire computer system.

BRIEF DESCRIPTION OF THE DRAWINGS

FIG. 10 is a screen shot of a server template according to the present invention.

FIGS. 14A, 14B-1 and 14B-2 are detailed diagrams of the steps in deploying a server instance to a processing element according to the present invention.

FIG. 16 is a screen shot indicating a new processing element has been found according to the present invention.

FIG. 22 is a screen shot of the fourth of the operations of FIG. 18.

DETAILED DESCRIPTION OF THE PREFERRED EMBODIMENTS

Figure 1:
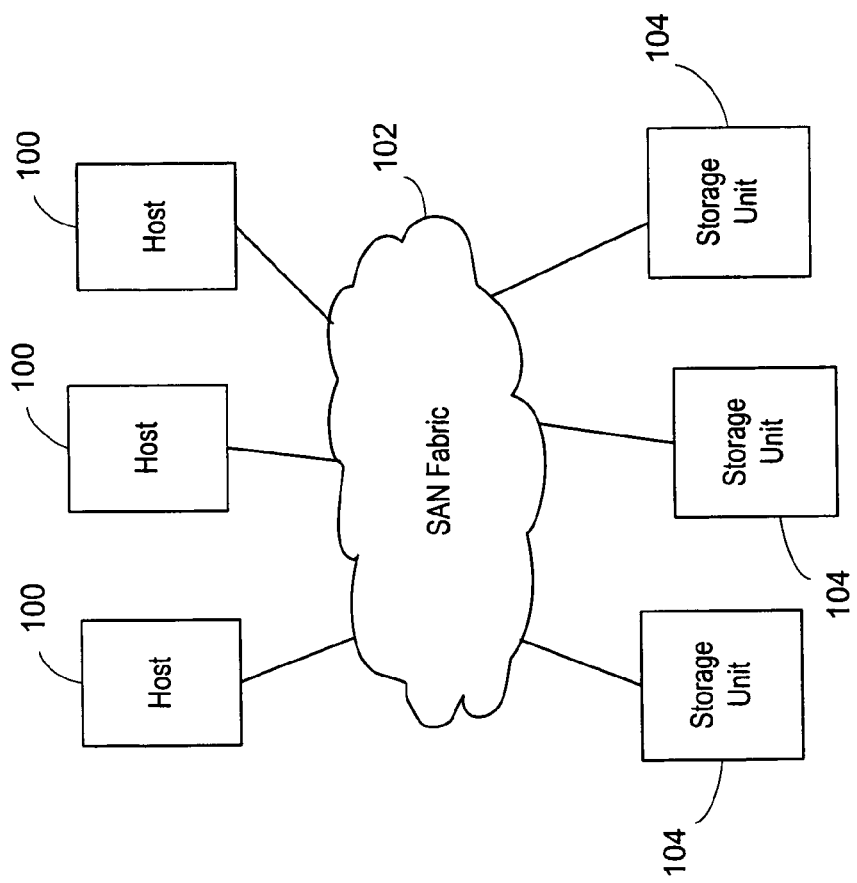
FIG. 1 is a block diagram of a storage area network generally showing a series of hosts, storage units and a fabric.

Referring now to FIG. 1, a brief overview of a storage area network or SAN is shown. A series of hosts 100 are connected through a SAN fabric 102 to a series of storage units 104. Preferably the SAN fabric 102 is comprised of a series of switches. The fabric can either be Fibre Channel or iSCSI or a mixture as required, with proper routing devices incorporated.

Figure 2:
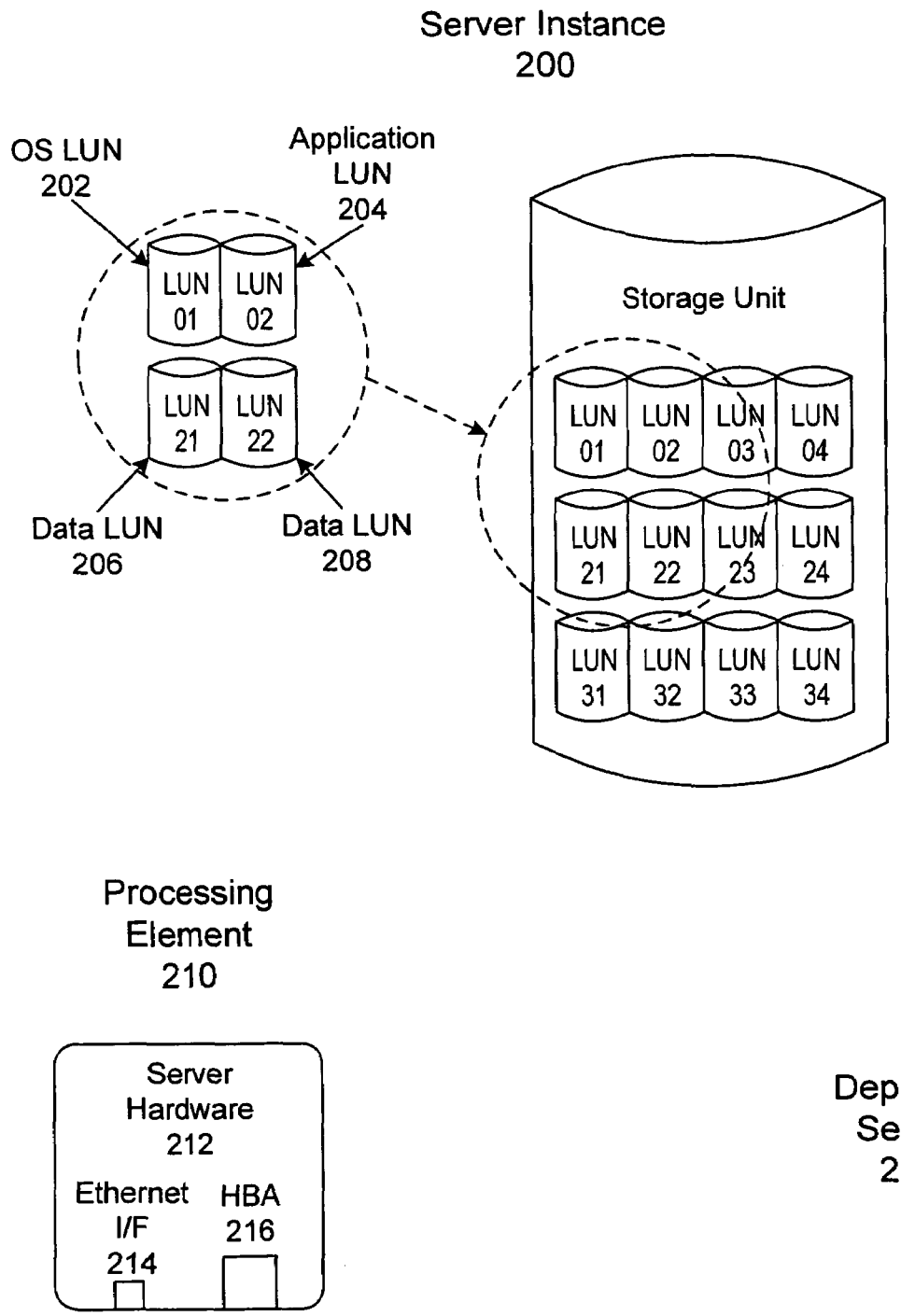
FIG. 2 is an illustration of a processing element and a server instance according to the preferred embodiment of the present invention.

Referring now to FIG. 2, two basic concepts according to the present invention are illustrated. The first concept is a server instance 200. A server instance 200 is thought of as the actual personality of a server. It includes an operating system LUN 202, an application LUN 204 and various data LUNs 206 and 208 as necessary. Example operating systems include Windows and Linux; various applications include Exchange, Oracle and so on. The second concept is a processing element 210. The processing element 210 includes server hardware 212, with the server hardware 212 including an Ethernet or network interface card 214 and a Fibre Channel or iSCSI HBA (host bus adapter) 216. Together the combination of a server instance 210 and the processing element 212 form a deployed server 220.

Figure 3:
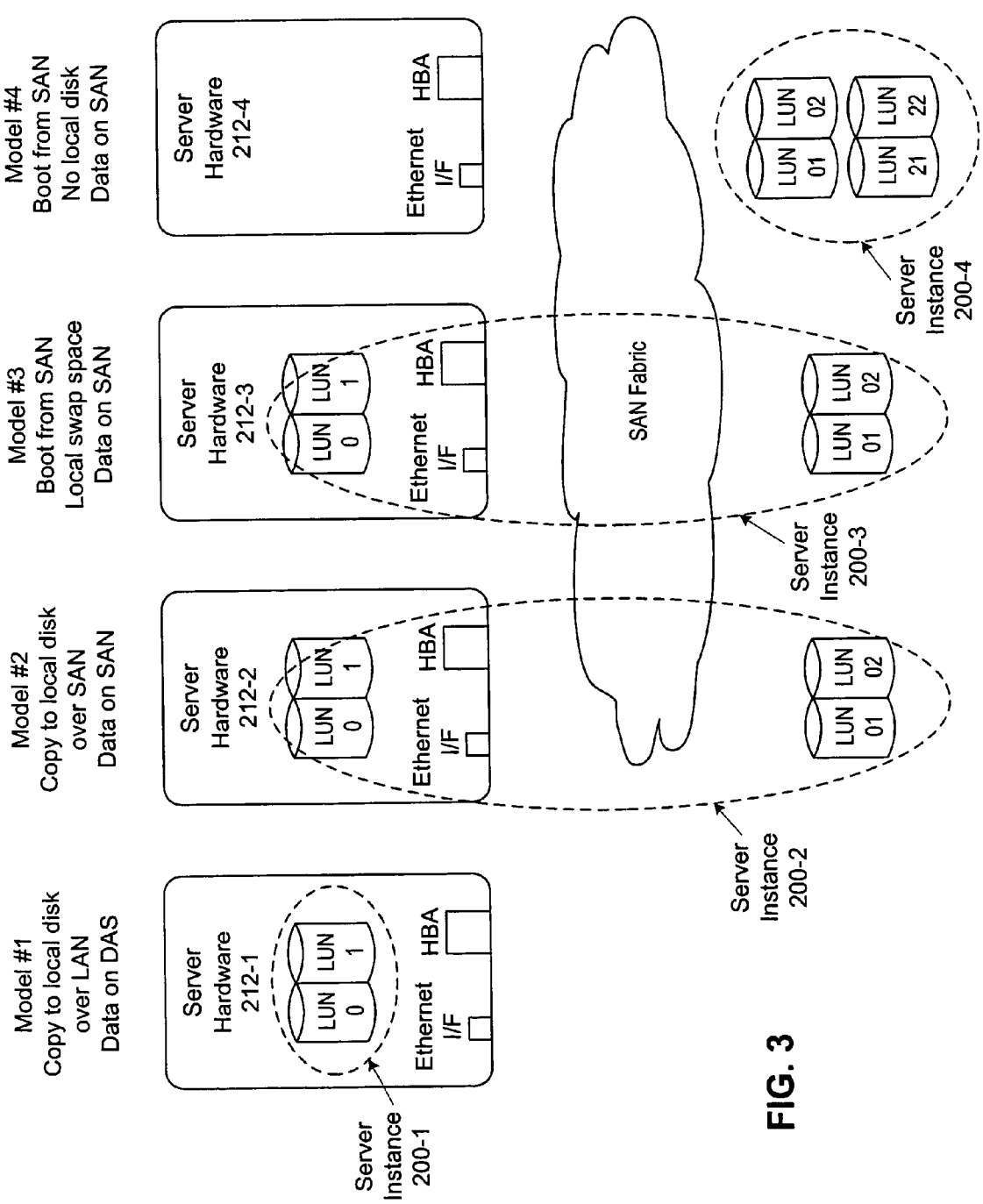
FIG. 3 is an illustration of various server instance deployment models according to the present invention.

Referring now to FIG. 3, four different models of server deployment are illustrated. In model 1 the server hardware 212-1 includes direct attached storage. In this embodiment the server instance 200-1 is located on the LUNs contained on the direct attached storage. In model 2 the server hardware 212-2 contains direct attached storage; however, the data is maintained in various LUNs on the SAN. Thus in this case the server instance 200-2 consists of a series of LUNs contained on the server hardware 212-2 and a series of LUNs contained on the SAN. Model 3 does include direct attached storage on the server hardware 212-3 but in this case it is used only as local swap space for the operating system. The actual boot copy of the operating system and the data, i.e., the server instance 200-3, are located out on the SAN, with only local swap space on the direct attached storage of the server hardware 212-3. The final model is model 4, which has no direct attached storage. In this case the server instance 200-4 is located entirely on the SAN with the operating system, application and data storage on various LUNs. The server hardware 212-4 thus has all storage on the SAN.

Each of the models has certain different aspects but are similar in that all can be managed in a generally similar fashion. In models 1 and 2 the operating system instance is copied from the appropriate LUN, either over an Ethernet network or from the SAN, to the direct attached storage located on the server hardware 212. In models 3 and 4 the processing element 210 boots from a server instance 200 located on the SAN. Though models 3 and 4 could be done over a LAN, preferably this would not be done because of performance considerations.

Figure 4:
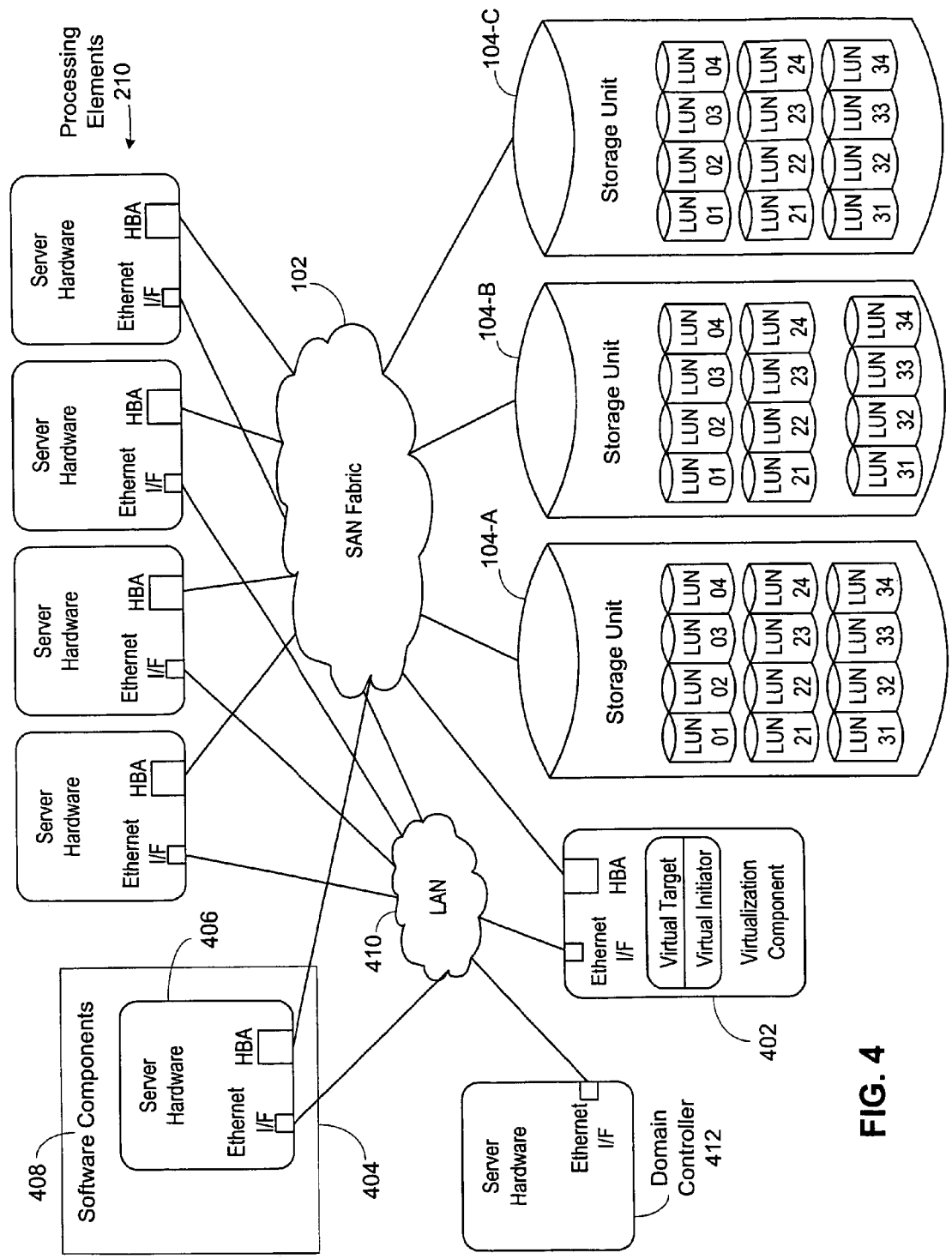
FIG. 4 is an illustration of various components in a system according to the present invention.

FIG. 4 illustrates the various components available in a system according to the present invention. There are a series of processing elements 210 connected to the SAN fabric 102, with a series of storage units 104 also connected to the SAN fabric 102. There is also a virtualization component or device 402 connected to the SAN fabric 102. The virtualization component 402 preferably is a virtualization device to be utilized in the case where the storage units 104 cannot properly map themselves to appear correctly to the processing elements 210. In that embodiment the virtualization component 402 presents the appropriate interface or LUNG to the processing element 210 and then translates the request received from the processing element 210 to be properly routed and provided to the appropriate LUNs in the various storage units 104. A management service processor 404 includes a hardware component 406 and a software component 408. Preferably the hardware component 406 is a generic server platform but other platforms could be used as desired. As is known to those of ordinary skill in the art, such platforms typically include one or more types of machine-readable storage medium (e.g., random access memory (RAM), read-only memory (ROM), magnetic storage (hard disks) and optical storage (CD-ROMs)), which may be used to provide long-term and/or short-term storage of the software component 408. The software component 408 provides various management functions to be described hereinafter. The management service processor 404 is connected to both the SAN fabric 102 and to a local area network or LAN 410. Each of the processing elements 210 is connected to the LAN 410 for PXE (pre-boot execution) capabilities. The management service processor 404 is connected to the LAN 410 to receive these PXE requests and to otherwise communicate directly with the processing elements 210. Shown for completeness is a domain controller 412 located on the LAN 410 which handles normal LAN functions such as DHCP (meaning either the protocol for Internet Protocol (IP) address assignment or such a service) serving, DNS and so on.

Figure 5:
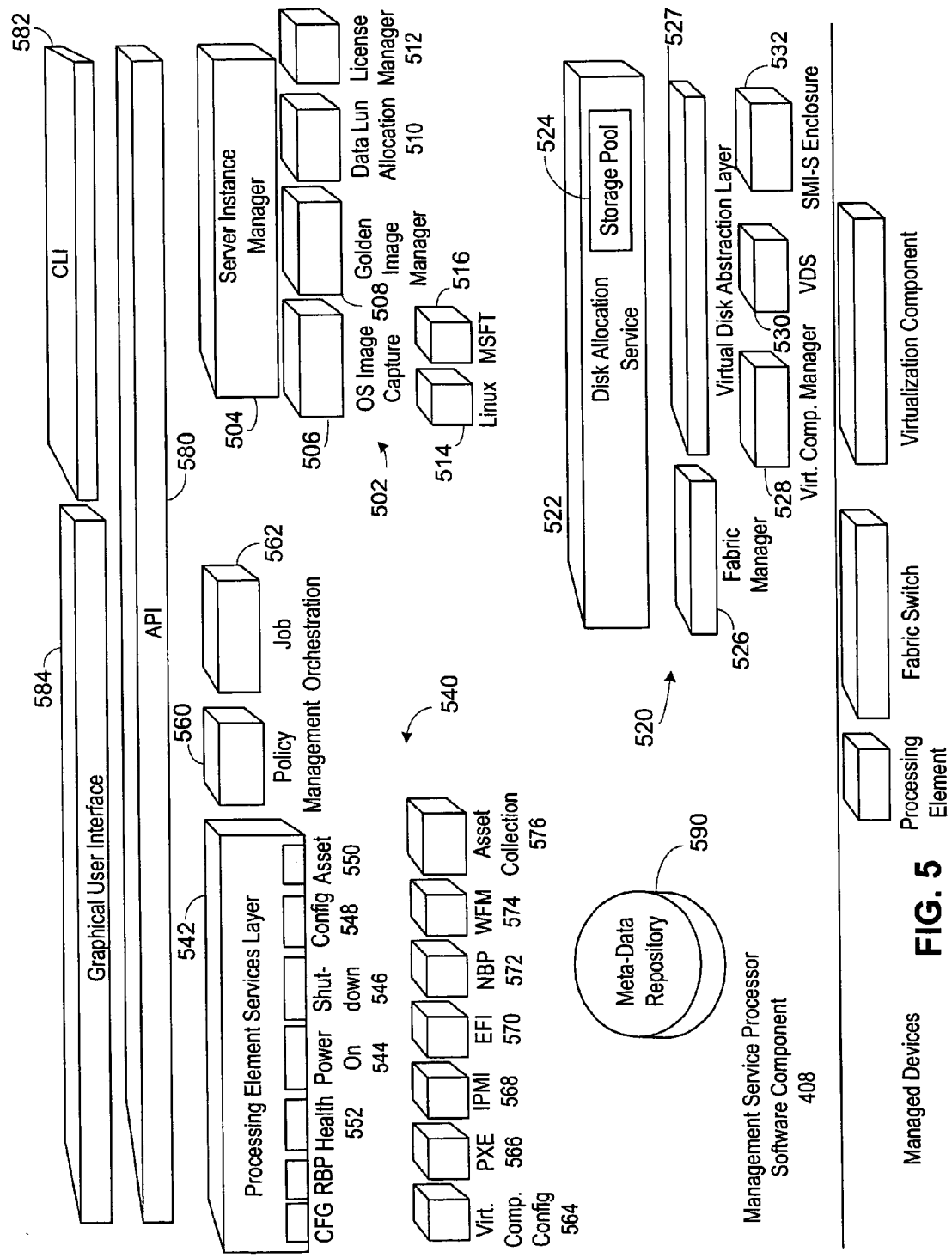
FIG. 5 is a block diagram of the software environment of a management service processor according to the present invention.

FIG. 5 illustrates the software architecture of the management service processor 404 according to the preferred embodiment. Not illustrated in FIG. 5 is the underlying operating system of the management service processor 404. This has been removed for clarity. A first portion of the software 408 is the server instance management section 502. This includes a server instance manager 504 which provides the overall management function for the server instances. Various subcomponents include an OS image capture module 506, a golden image manager 508, a data LUN allocation module 510 and a license manager module 512. Linux and Microsoft Windows server operating system image capture modules 514 and 516 cooperate with the image capture module 506 to provide the appropriate golden images. Operation of the image capture and various server instance management capabilities are illustrated and described below.

A second major portion of the software component 408 is the disk allocation services 520. The highest level module is the disk allocation service 522 which includes a storage pool of available LUNs 524. A fabric manager 526 is provided along with a virtual disk abstraction layer 527 to handle virtualization requirements. A hardware virtualization component manager module 528 is provided to operate with the hardware virtualization device 402 for virtualization capabilities. VDS (Virtual Disk Service from Microsoft) and SMI-S (Storage Management Initiative—Standard from the Storage Networking Industry Association) enclosure modules 530 and 532 are provided to cooperate with the various storage units 104 and their management techniques to properly configure aware storage units 104 with the proper LUNs and so on as required by the processing elements 210 for booting.

A third portion of the software component 408 is the operating services elements 540. The highest level is a processing element services layer 542 which includes submodules for performing various operations on the processing elements 210. These submodules include power on 544, to handle turning on processing elements; shutdown 546, to turn off processing elements; HBA configuration 548, to handle configuring HBAs to properly locate LUN0 for booting; asset 550, to determine the assets or devices in a processing element; and health 552, to respond to events affecting the processing element operation. A policy management module 560 and job orchestration module 562 are present to provide cross-checking and operations management. A virtualization component configuration module 564, a preboot execution module 566 to handle PXE requests from the processing element; an IPMI (Intelligent Platform Management Interface) module 568 to properly monitor and manage the processing elements, an EFI (Extensible Firmware Interface) module 570 to allow better interactions with the processing element hardware, an NBP (Network Bootstrap Program) module 572 to provide boot programs to the processing elements, a WFM (Wired for Management) module 574 to also provide for monitoring and management of processing elements; and an asset collection module 576 to aid in developing a database of the components of the processing elements are also present in this portion of the software 408. The operation of various modules will be described in more detail below as needed.

The next portion of the software 408 is the interface portion and this includes an API 580 which interfaces with a command level interface 582 and a graphical user interface 584. Preferably the graphic user interface 584 is based on a web server so that an administrator need only point a browser to the management service processor 404.

Finally, a meta-data repository or database 590 is contained in the software 408 to store the various allocations and data about the processing elements, sever instances, operating system images and so one.

Figure 6:
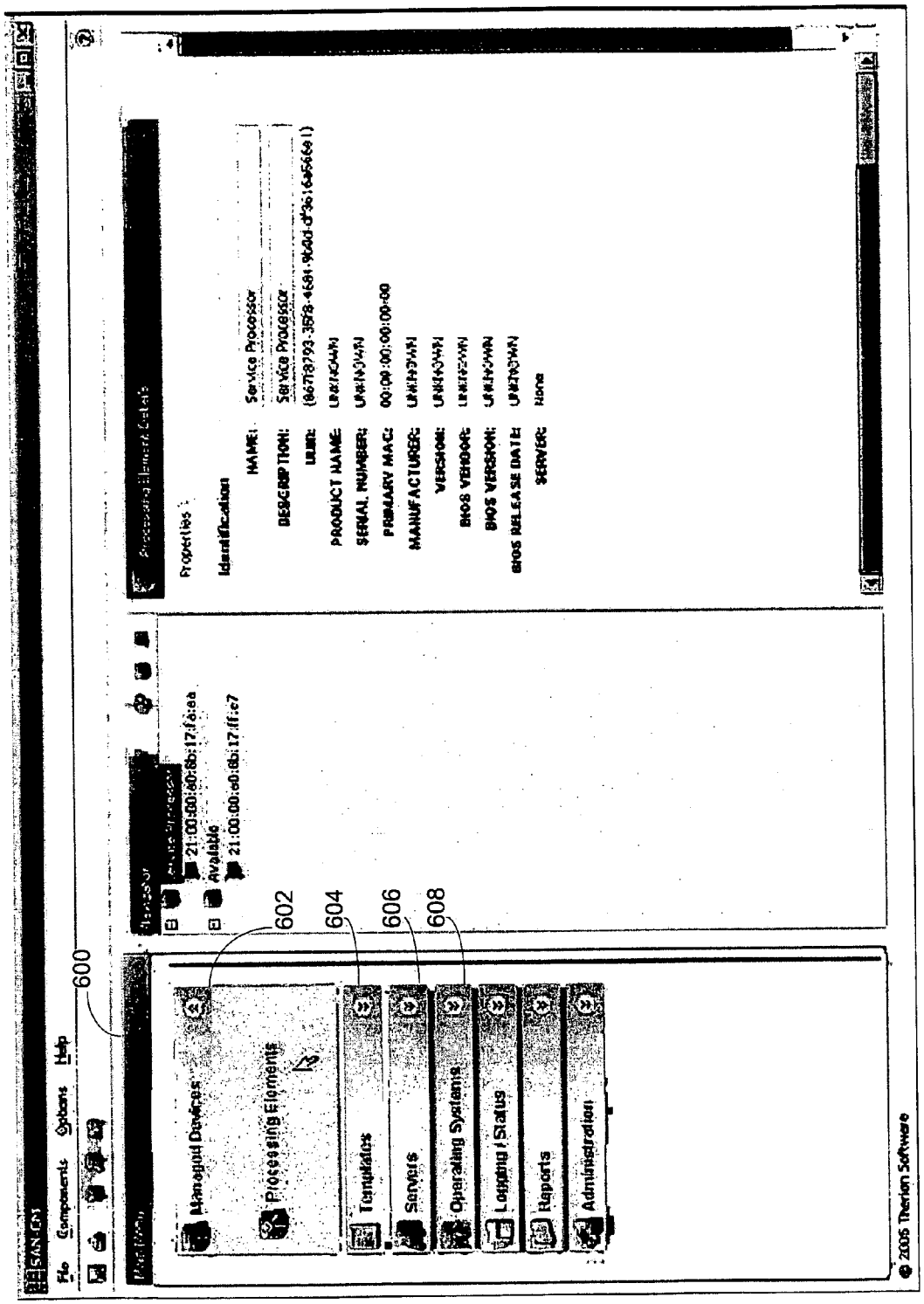
FIG. 6 is a screen shot of a graphical user interface of a management tool utilized by an administrator according to the present embodiment.

Proceeding now to FIG. 6, the opening screen of the management or administrative graphical user interface is shown. A left hand column includes a main menu portion 600. Included in the main menu portion 600 are managed devices 602, templates 604, servers 606, operating systems 608, and other relevant primary tabs. Various steps performed under each of these tabs 602-608 will be explained below.

Figure 7:
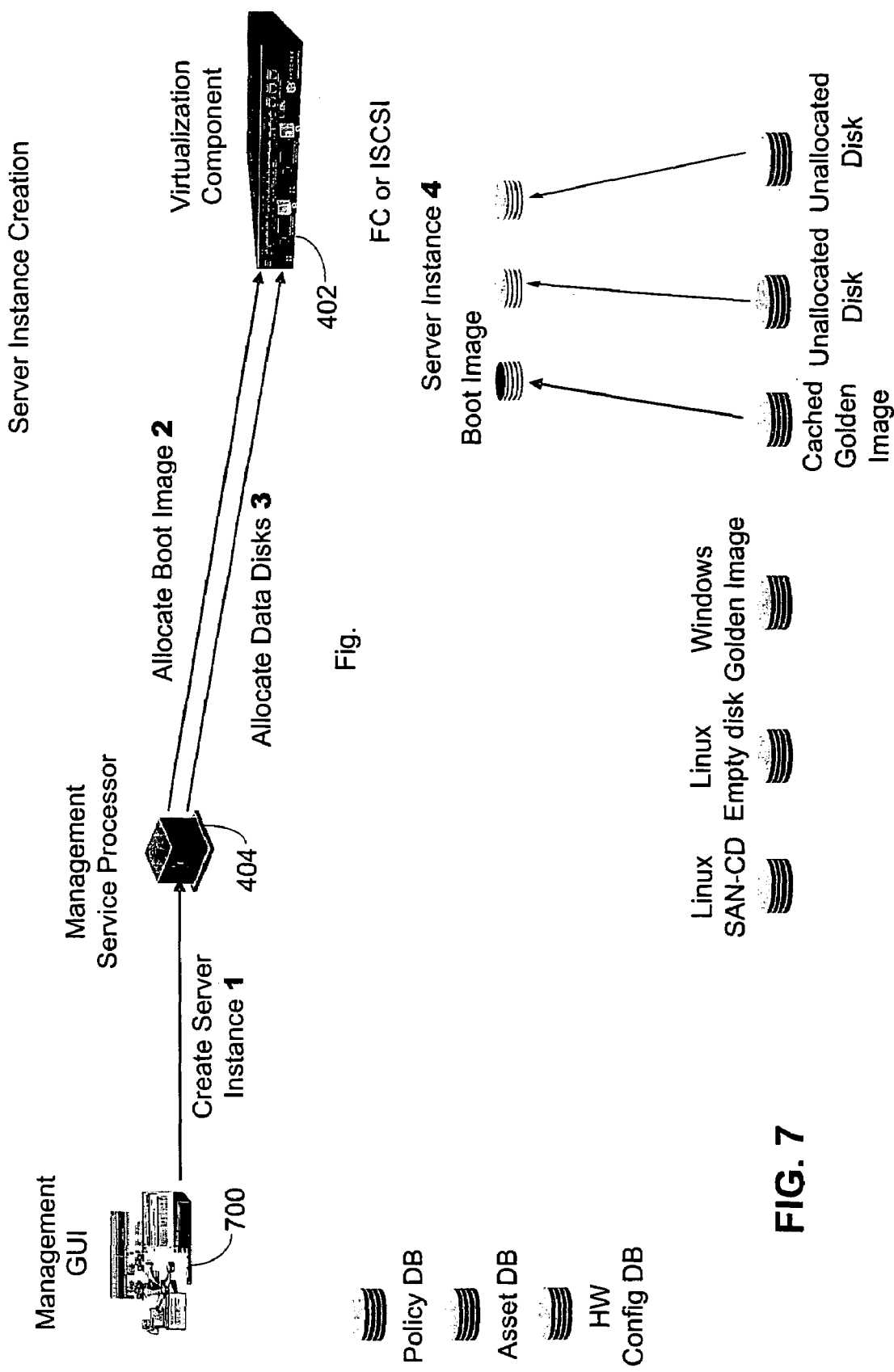
FIG. 7 is an illustration to indicate various operations in developing a server instance according to the present invention.

Referring now to FIG. 7, basic operations of developing a server instance are described based on the various components according to the present invention. The management graphical user interface 700, which appears on the administrator's desktop computer, is connected to the management service processor 404 by a LAN link from the desktop computer. In this preferred embodiment the management service processor 404 is connected to the virtualization component 402. To begin operation an administrator uses the management GUI 700 to contact the management service processor 404 to create a server instance in step 1. The management service processor 404 in step 2 then allocates the proper boot image as described below. In the third step, the management service processor 404 allocates the data disks. Thus, this creates the completed server instance as step 4.

Figure 7A:
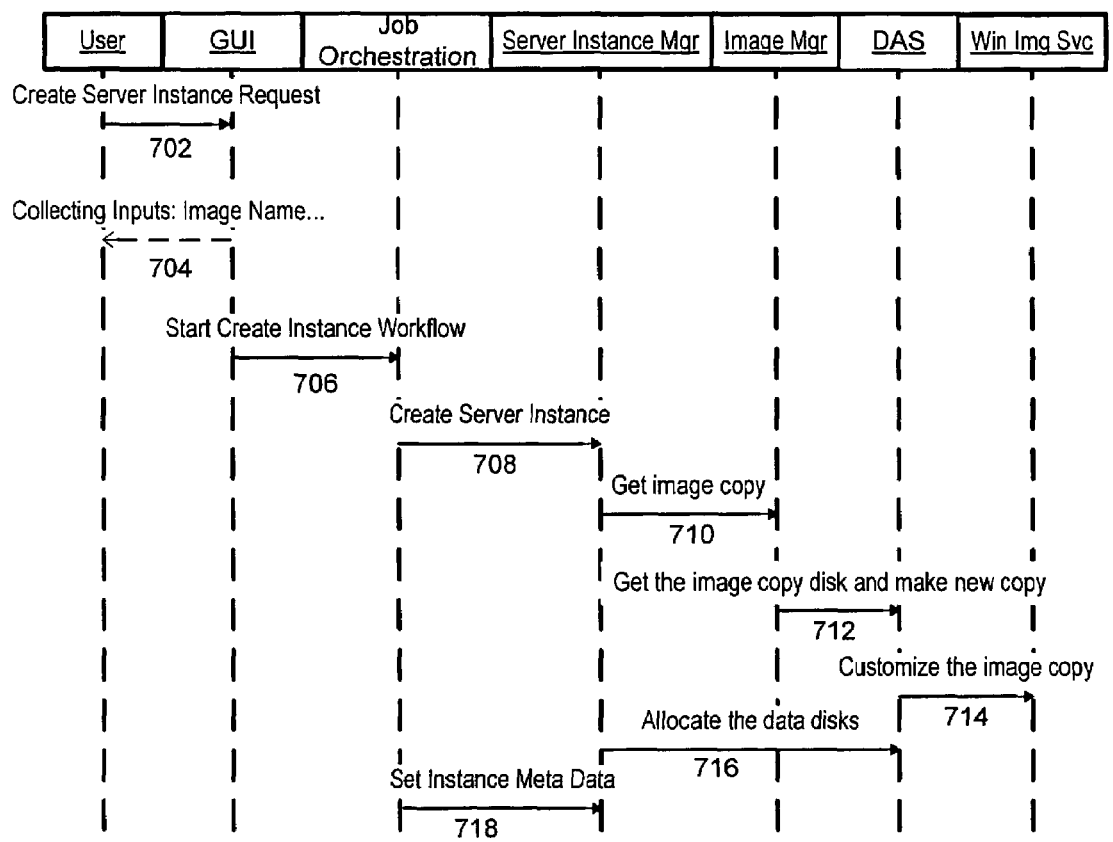
FIGS. 7A and 7B are detailed diagrams showing development of server instances according to the present invention.
Figure 7B:
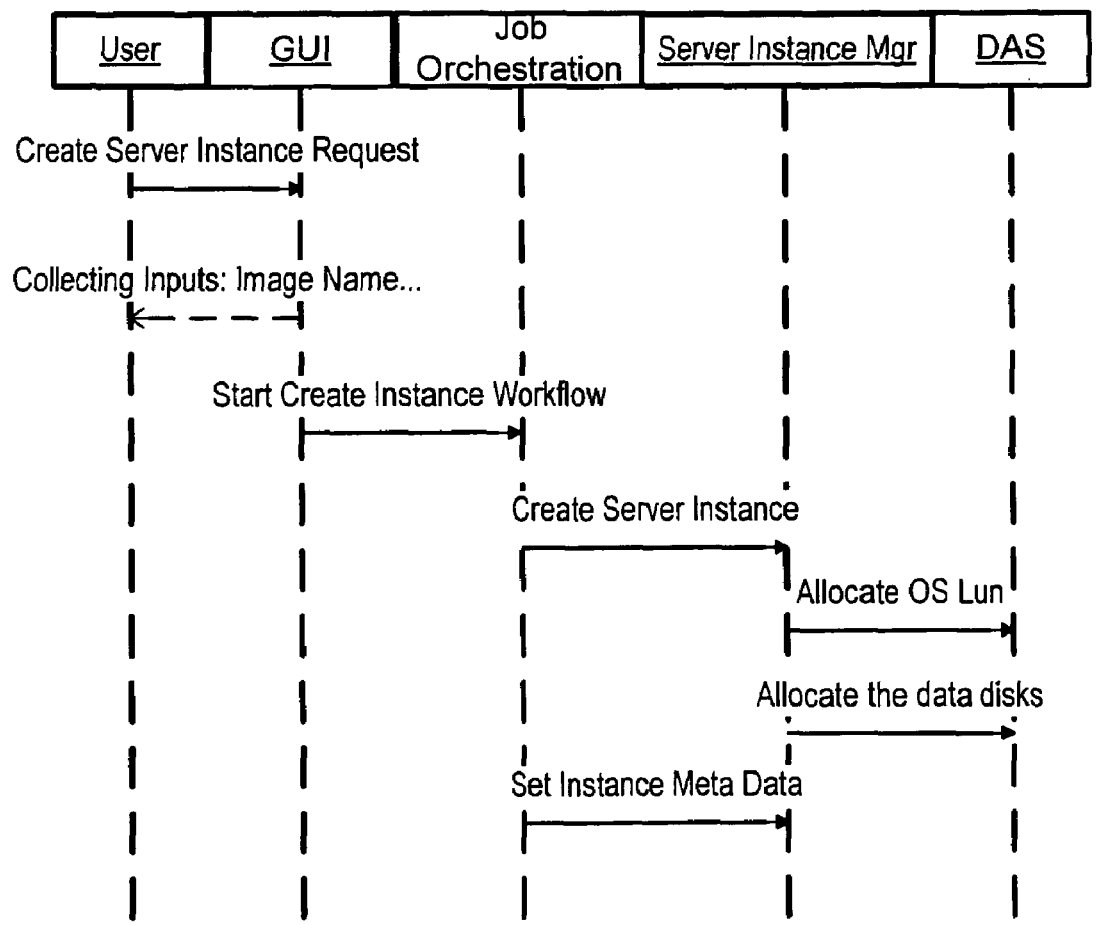

FIGS. 7A and 7B provide more detail on the creation of Windows and Linux server instances. Referring to FIG. 7A, in step 702 the user or administrator issues a request to develop a server instance. The various inputs to be described below are collected in step 704. In step 706 the GUI provides the request and data to the job orchestration module 562. In step 708 the job orchestration module 562 communicates with the server instance manager 504 to create the server instance. The server instance manager 504 requests an OS image from the golden images manager 508 in step 710. In step 712 the image manager 508 communicates with the disk allocation services 522 to obtain the location of the desired golden image and to obtain a LUN on which to place a copy of the golden image for use by a processing element. This information is provided to a Windows Imaging Service to customize the golden image of this server instance. Preferably the Windows golden images are depersonalized and prepared for booting using a tool such as sysprep for Windows environments. The image is repersonalized when it is booted the first time. Any application instances would be created in a fashion similar to the operating systems, namely by finding a master version and copying it to an assigned LUN. This application instance development has not been shown for simplicity. In step 716 the server instance manager 504 requests various data LUNs from the disk allocation service 522. The disk allocation service 522 includes a database of the LUNs under the control of the management service processor 404. This database is the storage pool 524. The list of LUNs is developed by the administrator manually indicating LUNs or automatically when the administrator indicates a storage unit 104 is under control of the management service processor 404 and then all of the LUNs exposed by that storage unit 104 are incorporated into the pool. This database is the storage pool 524. The disk allocation service keeps track of allocated and available LUNs. The disk allocation service keeps track of allocated and available LUNs. The necessary LUNs are allocated based on specified parameters such as needed space, redundancy type and cost. As LUNs are assigned for the OS image copy and the data, they are removed form the available pool. As the various LUN information for the OS and data disks are received, the job orchestration module 562 provides this information in step 718 to the meta-data repository 590 as the requested server instance.

Linux server instance creation is slightly simpler because personalization of the OS in the preferred embodiment is performed based on a customized script generated based on the operating system configuration file, so the customization step is not done at this time. Otherwise similar steps are performed as shown in FIG. 7B.

Figure 8:
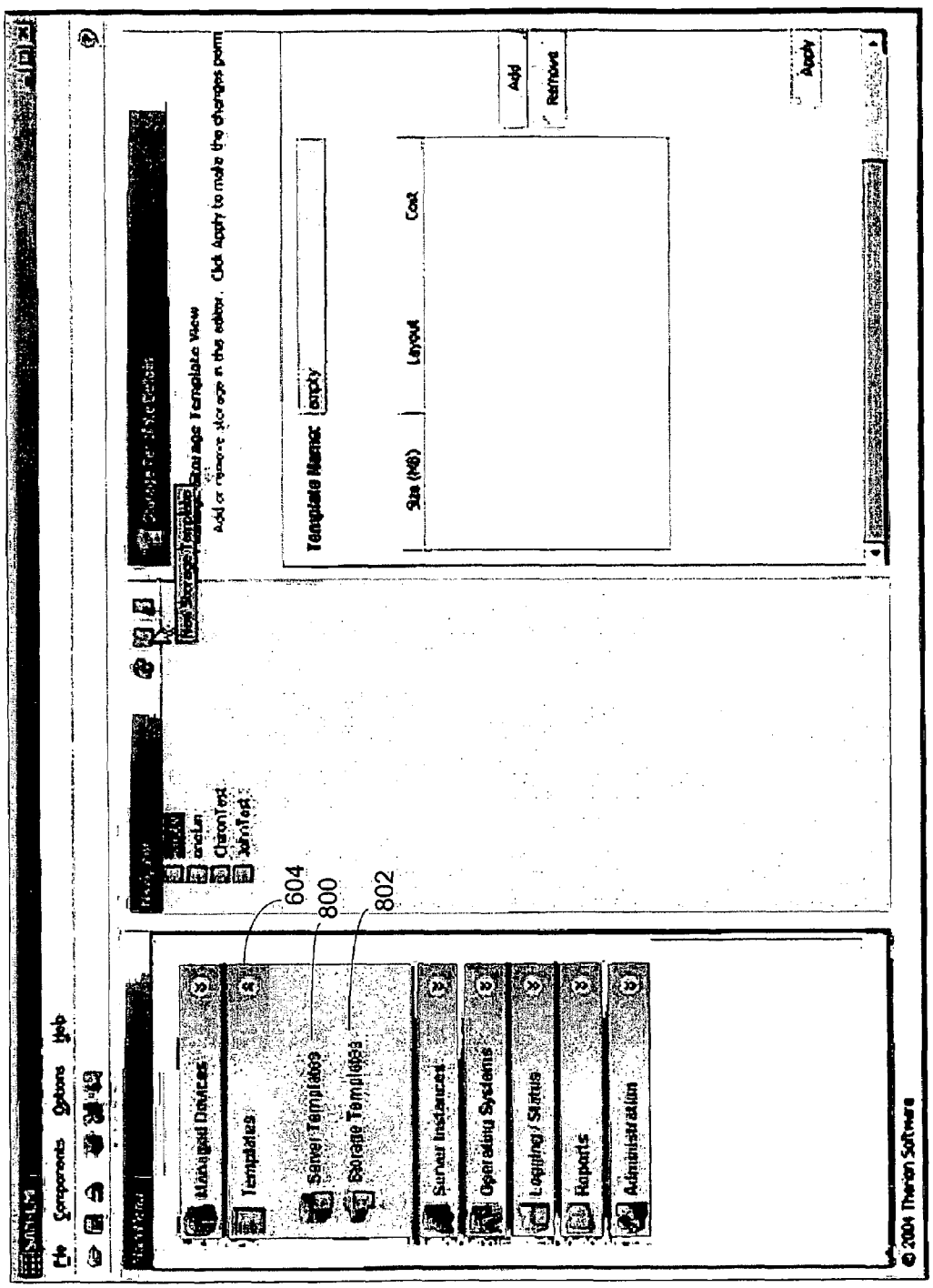
FIG. 8 is a screen shot of a basic template creation screen according to the present invention.
Figure 9:
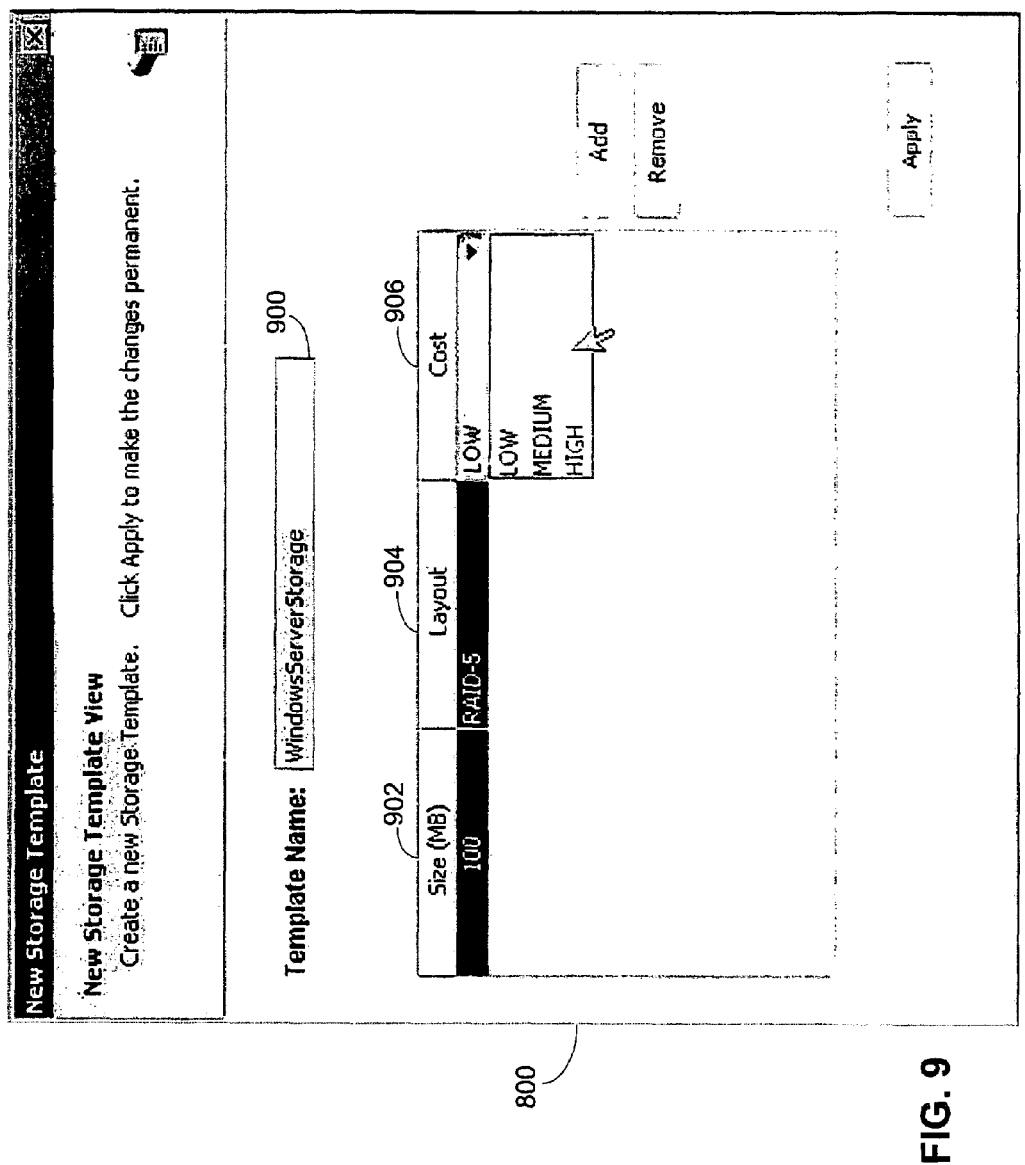
FIG. 9 is a screen shot of a storage template according to the present invention.

With this description of the particular steps, we proceed to FIG. 8 which is a screen shot of the home template page. As can be seen, there are server templates 800 and storage templates 802. FIG. 9 illustrates the entries available for a storage template 800. The first requirement is to define a template name 900 for later reference and use. Then for the particular template there are a series of options. The first option is the size of the storage required in column 902. This can be any desired size in megabytes, gigabytes or so on. Column 904 provides the second option, which is the layout or redundancy options. The layout options include JBOD (just a bunch of disks) or SIMPLE, RAID 0, RAID 1, RAID 5 and other options as desired for data integrity, as well as ANY, which requires only the desired size be available. The third column provides a cost aspect 906 for the particular storage template. The options are low, medium and high and these can be assigned to particular storage units 104 based on their actual cost of operation and overhead charges.

Proceeding then to FIG. 10, a server template 802 is shown. The first entry 1000 is an entry for the template name to allow later reuse of this particular template. The next entry 1002 is how the operating system is installed. The options identify whether a scripted install or an image-based install is to be used. The next available option 1004 for the administrator is the OS installation name, which indicates the operating system and version to be used. Entry 1006 is an OS configuration file such as sysprep.inf, answer.txt or Linux Kickstart, which indicates the configuration or script file to be used to install and/or prepare the golden image. The next entry is the storage template 1008, such as the one which was just defined in FIG. 9, so that the relevant storage elements can be applied to the particular server template. At the bottom of the illustrated screen 802 are storage allocation entries 1010 and 1012 for the operating system. The entry 1010 is for the layout such as RAID 0, RAID 1, RAID 5 and the second entry 1012 is for the cost of the storage of the operating system. With these parameters entered, the administrator can hit the apply button and a server template is created.

Figure 11:
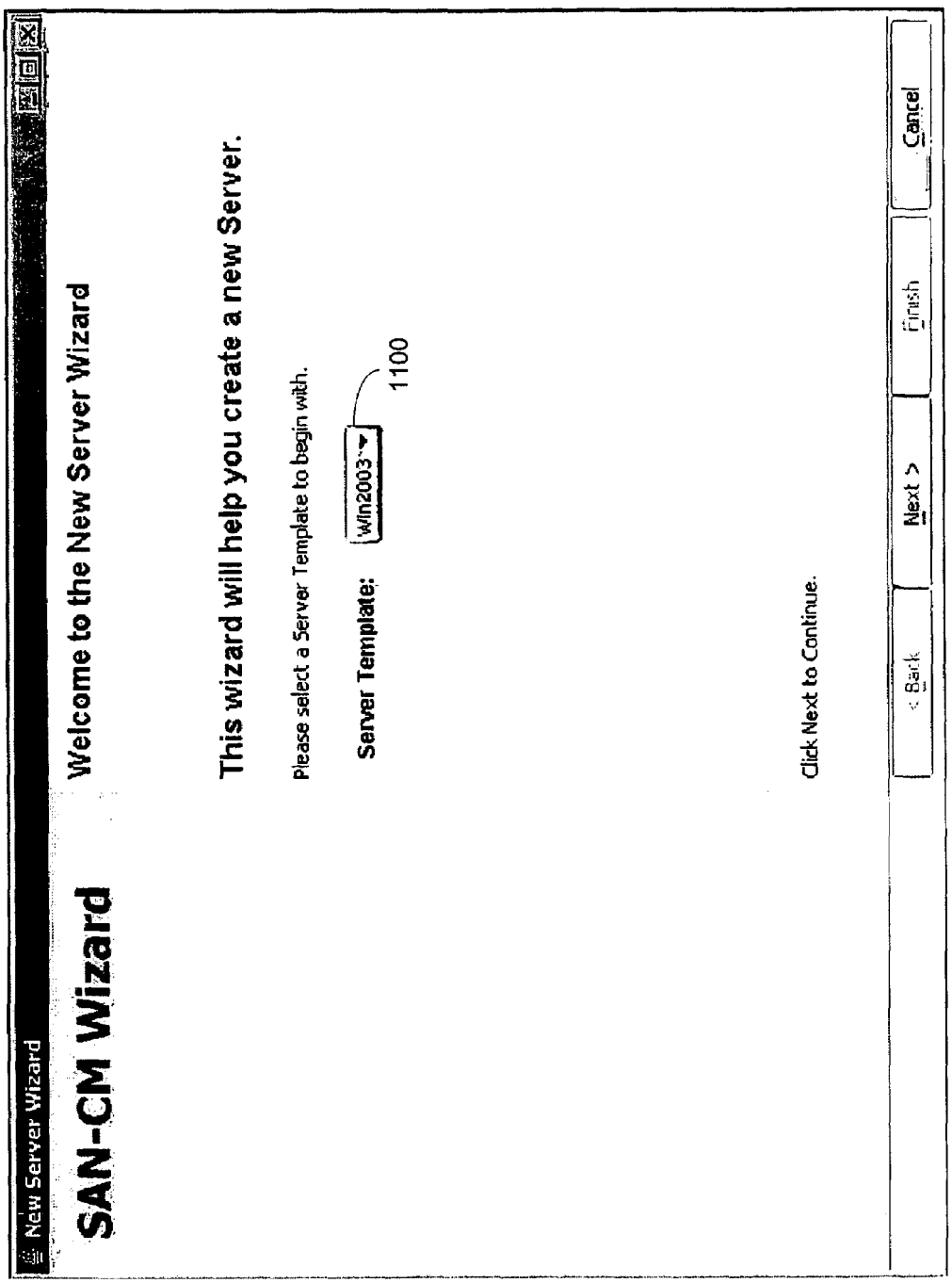
FIG. 11 is a screen shot of a wizard to create a new server according to the present invention.
Figure 12:
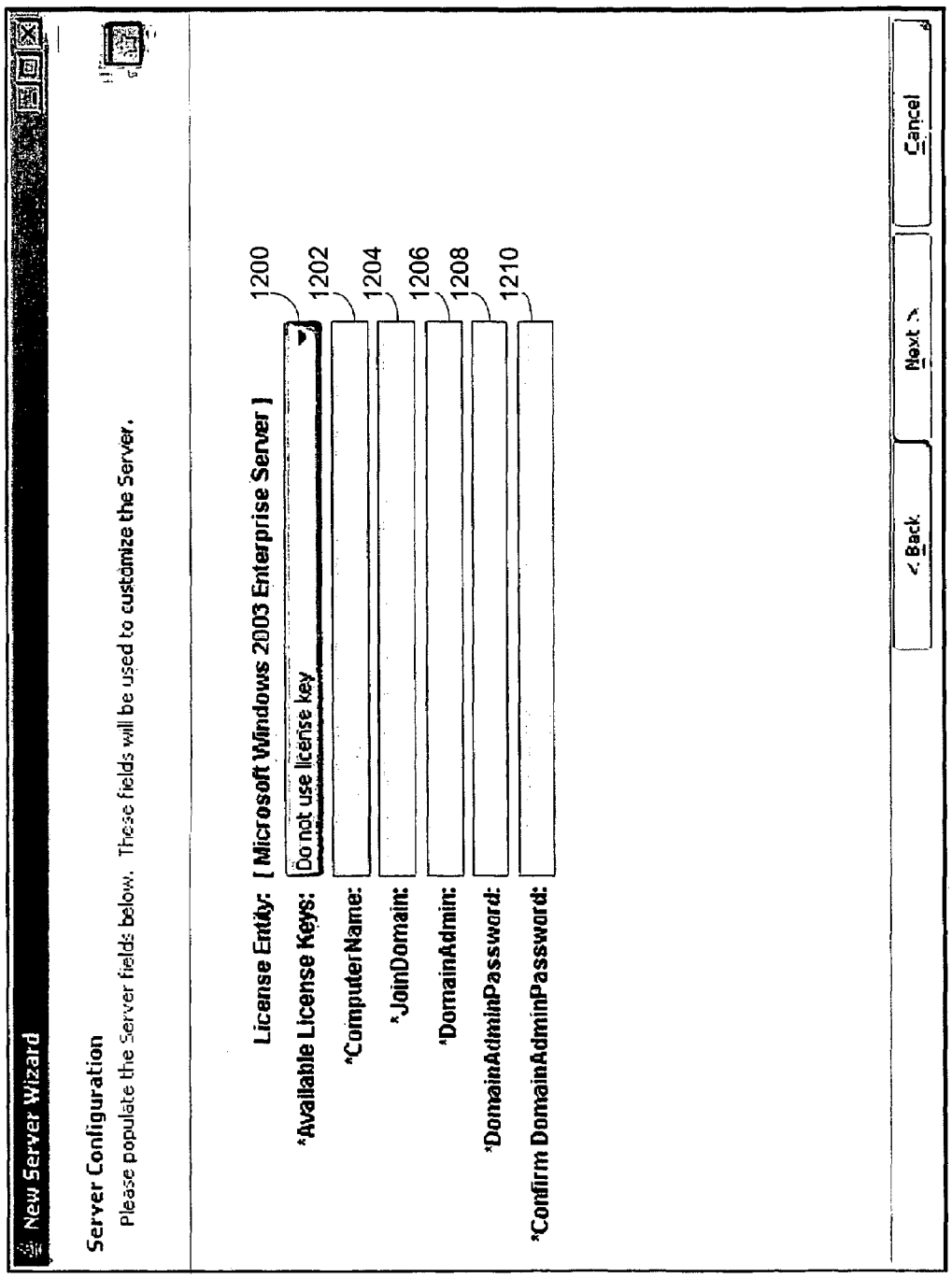
FIG. 12 is a screen shot of a data entry screen for server configuration according to the present invention.

By developing storage and server templates, the development and deployment of actual physical assets is significantly reduced because in enterprise environments most servers will fall into one of the common categories, be it a Windows server used for Oracle operations, a Linux mail server and so on. With the templates previously developed as just indicated above, a server instance is created by starting the new server wizard screen as shown in FIG. 11. The entry 1100 on this screen is to select a particular server template as just developed. After the particular server template has been selected, the next screen that appears is in FIG. 12, which is a Windows example. Based on the particular server template, a license entity will be shown. The next available entry is the available license keys in block 1200. Because the management service processor 404 is in control of deploying the particular operating system images, it is the appropriate entity to actually manage the number of licenses actually utilized and therefore providing the license keys to the management service processor 404 simplifies the task of managing licenses and deploying operating systems and applications. The dropdown box

1200 lists available license keys and one is selected. In block 1202 the particular name for this server is placed. In block 1204 the domain, in the case of a Windows system, is entered along with the domain administrator information in block 1206. Blocks 1208 and 1210 are the password for the administrator to allow automated operations. The indicated fields are exemplary for a default Windows instance and are varied as appropriate based on operating system and environment requirements.

While separate storage and server templates are preferred, they can be merged if desired. Alternatively, they could be expanded to specify and manage additional attributes, such as prepopulation of data luns with initial data or applications.

Figure 13:
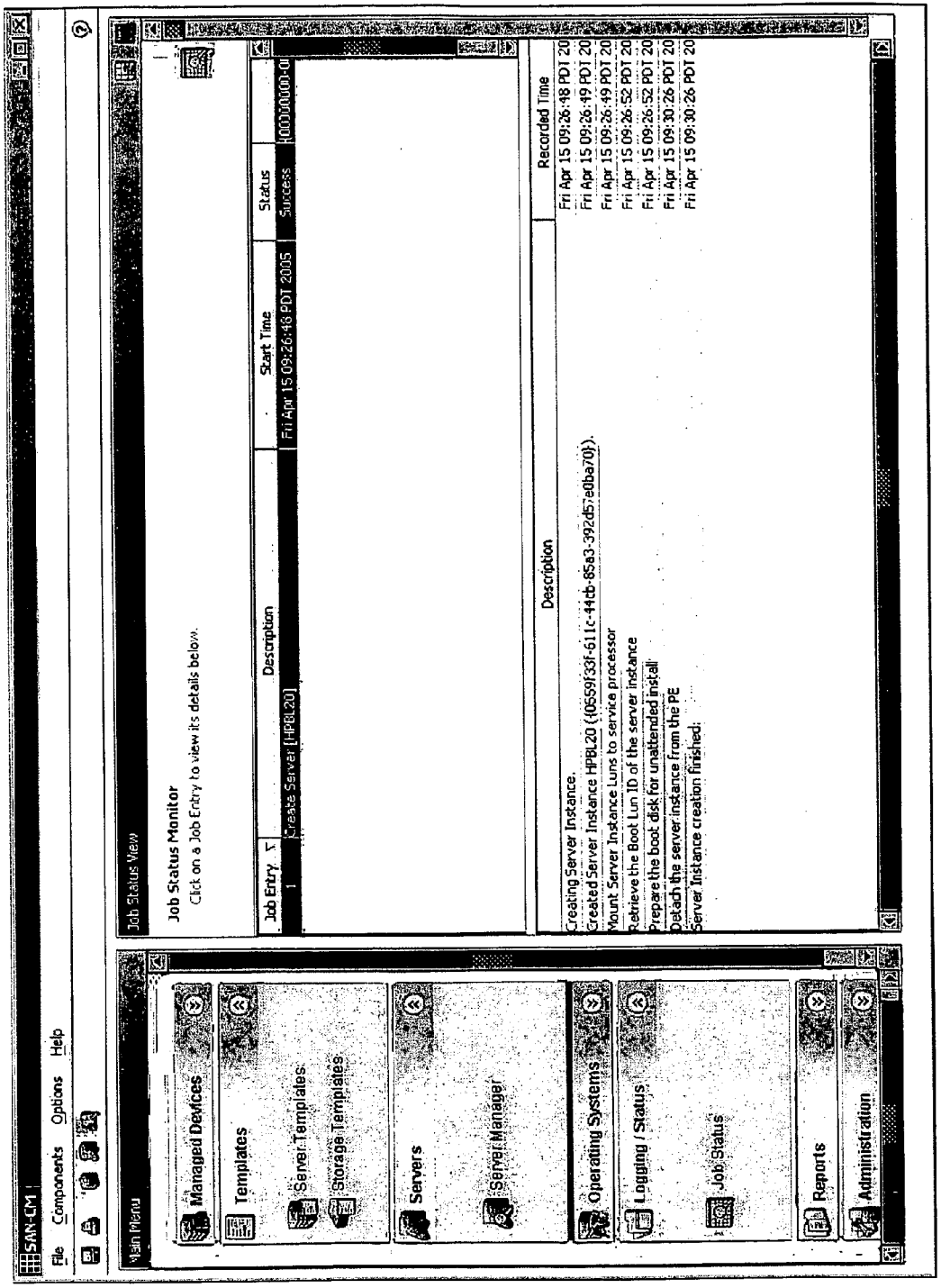
FIG. 13 is a screen shot illustrating various operations in the creation of a server instance according to the present invention.

The management service processor 404 then proceeds to automatically develop the server instance as described above. The list of operations described above can be seen in FIG. 13. The process begins by obtaining the information from the previous screens. With that, the management service processor 404 is able to select the particular LUNs to be used for both the operating system, the application if appropriate, and the data LUNs. From the storage pool 504 and from the known OS images as described later, the management service processor 404 allocates the LUNs. For the next step, the OS image and boot LUN information are retrieved and a boot disk is prepared. This then effectively completes the development of the server instance 200.

Now that the server instance 200 has been created, it is appropriate to deploy it to a processing element 210. For the preferred embodiment this is an automated process not requiring particular agents or any administrator support other than identifying the particular server instance 200 to attach to the processing element 210. The process begins at step 1 of FIG. 14 where the processing element 210 is powered on. As the processing entity is preferably configured to do network or PXE boot, a PXE request is then provided by the processing element 210 as step 2. This request is received by the management service processor 404. In step 3 the management service processor 404 then obtains hardware configuration and settings from a hardware configuration database in the meta-data repository 590 if the processing element 210 has been previously deployed or otherwise had its configuration loaded into the system. If the processing element 210 is not found in the meta-data repository 590, the management service processor 404 in step 4 then provides a mini-DOS operating system image over the LAN to the processing element 210. This is a simplified mini-DOS operating system and its function is to determine the particular hardware elements present in the particular processing element 210. Once this mini-DOS operating system is provided to the processing element 210, it runs the program to determine its hardware assets and returns those as step 5. Then in step 6 the management service processor 404 stores the hardware assets present in the particular processing element 210 in an asset database on the meta-data repository 590 to allow management and tracking of particular units.

With the hardware assets stored, using WFM commands the management service processor 404 in step 7 provides a reboot command to the processing element 210, although a power off command can be provided if desired. The management service processor 404 in step 8 then provides the server instance information as required to the virtualization component 402 or to the various storage units 104 so that the particular LUNs necessary to allow booting and access of the data and applications are active and present in the SAN fabric. This step 7 includes properly setting up zoning and other items as required for proper fabric operations. As the management service processor 404 knows the SAN address of the processing element 210 from the asset determination and knows the various LUN SAN addresses, it can readily communicate with the zoning mechanism in the SAN fabric to place the processing element and the LUNs in the same zone. The management service processor 404 cooperates with the virtualization component 402 as needed to have the virtualization present the proper LUN0 and to indicate the mapping from the LUN0 to the actual LUN in the relevant storage unit. In the virtualization case, the zoning is then between the processing element 210 and the LUNs appearing on the virtualization component 402 and the relevant storage unit.

After the server instance has been attached to the processing element 210 as step 8, then in step 9 the management service processor 404 provides a power on request if necessary, preferably by doing a wake on LAN (WOL) operation, to the processing element 210. With the processing element 210 then powering up, it again provides a PXE request as step 10. In response, the management service processor 404 in step 11 provides another mini-OS to properly program the HBA to boot from LUN0. LUN0 is used in this description as the default boot LUN but other LUNs can be used if the storage units support the operation. To configure the processing element 210, the mini-OS program performs device IOCTL (IO control) operations to the HBA under the direction of the management service processor 404. Each HBA contains an API or UI to allow programming of internal parameters on the HBA. Using these IOCTL operations the desired HBA port is indicated and the SAN address of the device containing LUN0 is provided. The HBA stores this information in internal non-volatile RAM. After configuring the HBA, the mini-OS reboots the processing element 210, which provides another PXE request as step 12. In this case the management service processor 404 provides in step 13 a by-pass loader to the processing element 210. The by-pass loader causes the BIOS in the processing element 210 to immediately pass control to the next boot device, the hard disk, which then results in the processing element 210 attempting to boot from LUN0. The bypass loader immediately passing control is not required but is preferred to speed up operations because often the timeouts present on the system BIOS to try the hard disk can be long, just delaying the operations in this case. Thus when the bypass loader has been provided, the BIOS in the processing element 210 effectively automatically boots to LUN0 in the preferred embodiments, which is the HBA, which has been previously programmed with the proper addressing by world wide name (WWN) and LUN of the boot image. The HBA will then request information from the boot image, load the boot image and then proceed to install the operating system and execute. With this operation the server instance is deployed as step 12.

FIGS. 14A, 14B-1 and 14B-2 provide additional details for Windows and Linux server instance deployment. Some of the operations may be performed in a different order from that illustrated in FIG. 14 (and the same is true for FIGS. 7A and 7B with respect to FIG. 7), but they are not conflicting because the timing of various of the steps can be changed, as apparent to one skilled in the art. Addressing first FIG. 14A, in step 1400 the administrator provides a deploy request to the GUI 700. The GUI 700 provides the request to the job orchestration module 562 in step 1402. In step 1404 the server instance 200 is attached to the processing element 210. As described above this is done by properly setting zoning to allowing access. This is done as two operations 1406 and 1408 where the OS LUN and the data LUNs are attached. Any application LUN is attached in a similar manner. For clarity the step of configuring the HBA to LUN0 is not shown. In step 1410 the boot policy is indicated as bypassing to the hard disk in the policy manager 560. In step 1412 the processing element is turned on and then in step 1414 the processing element 210 performs the PXE operation to the PXE module 566. The PXE module 566 determines from the policy manager 560 that the policy is to bypass the hard disk, so the bypass loader is provided. This causes the processing element 210 to bypass the hard drive in step 1416 and boot the Windows setup from LUN0 in step 1418. Windows installs and the processing element is running in step 1420.

Linux deployment is similar, except that first the processing element 210 must generate its own installation of Linux. This is done in the preferred embodiment by using a Linux unattended install utility and then mapping in the installed OS. Thus in step 1430 the installation program server instance is attached to the processing element 210. In steps 1432 and 1434 the OS and data LUNs are attached. In step 1438 a file to control the installation and provide the customization is created by the job orchestration module 562. The boot policy is set to bypass in step 1440 and the processing element 210 is turned on is step 1442. The processing element 210 PXE request results in the installation of the OS in step 1444. In step 1446 the processing element 210 informs the job orchestration module 562 that installation is completed. In steps 1448, 1450, 1452 and 1454 the various LUNs are unmapped or detached. The bypass policy is again set to bypass in step 1410. The server instance is now attached as before in steps 1404, 1406 and 1408 and the processing element restarted in step 1412. As before, the PXE request of step 1414 results in the processing element 210 booting to LUN0 so that in step 1456 the Linux OS is booted. To provide further understanding of some of the operations, selected screen shots are shown and described below.

Figure 14:
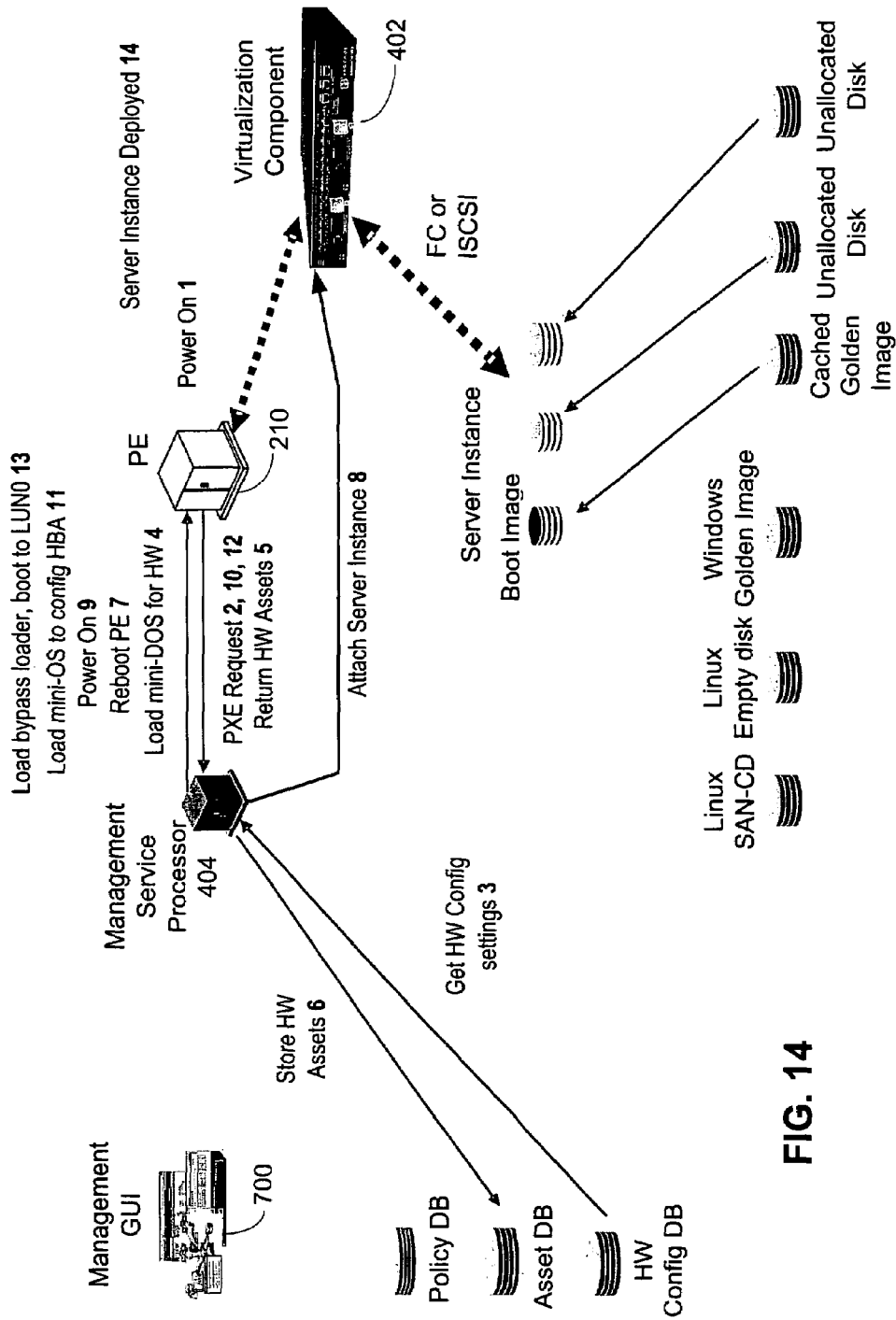
FIG. 14 is an illustration of various operations to deploy a server instance to a processing element according to the present invention.
Figure 14A:
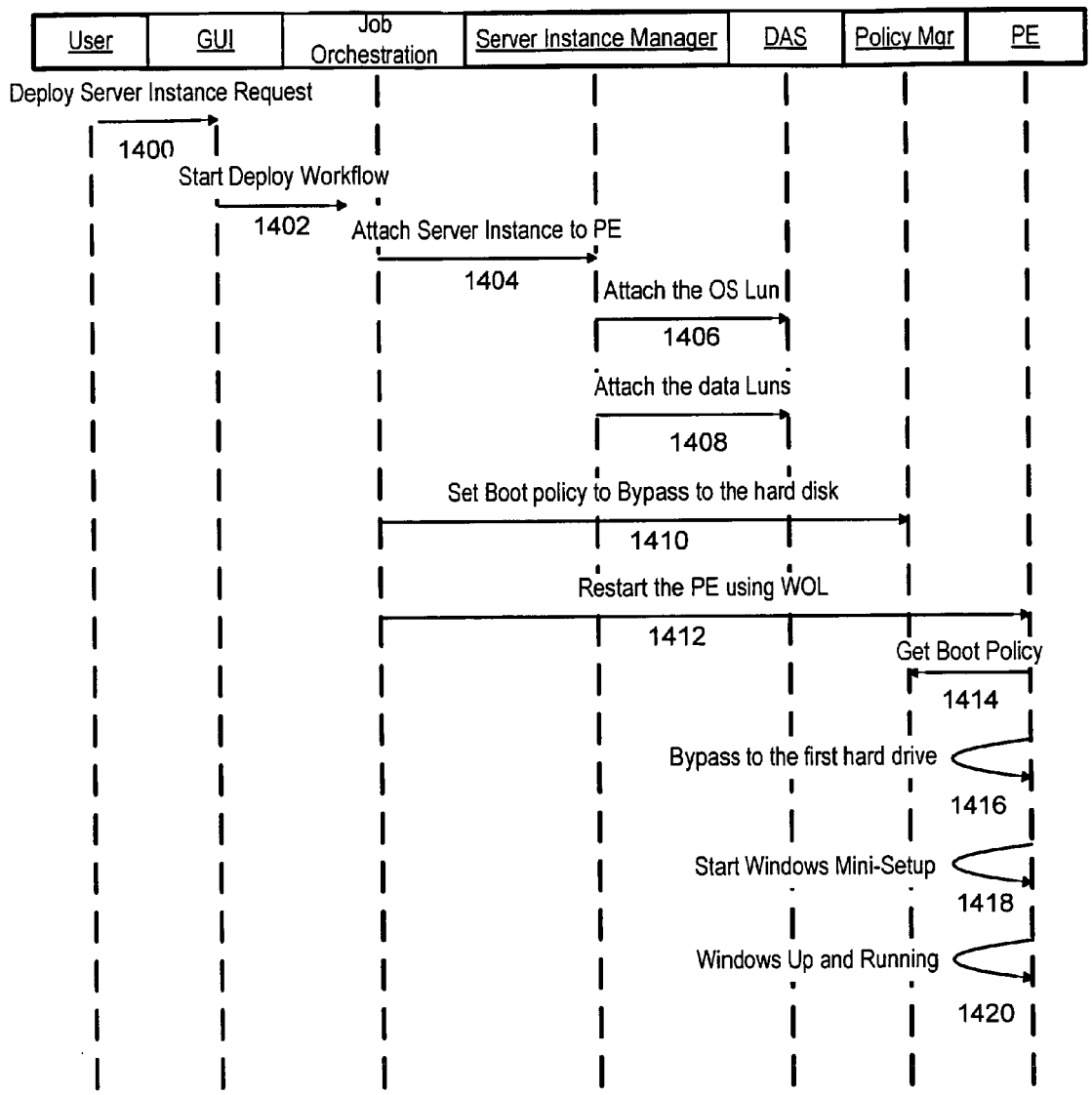
Figures 1, 14B:
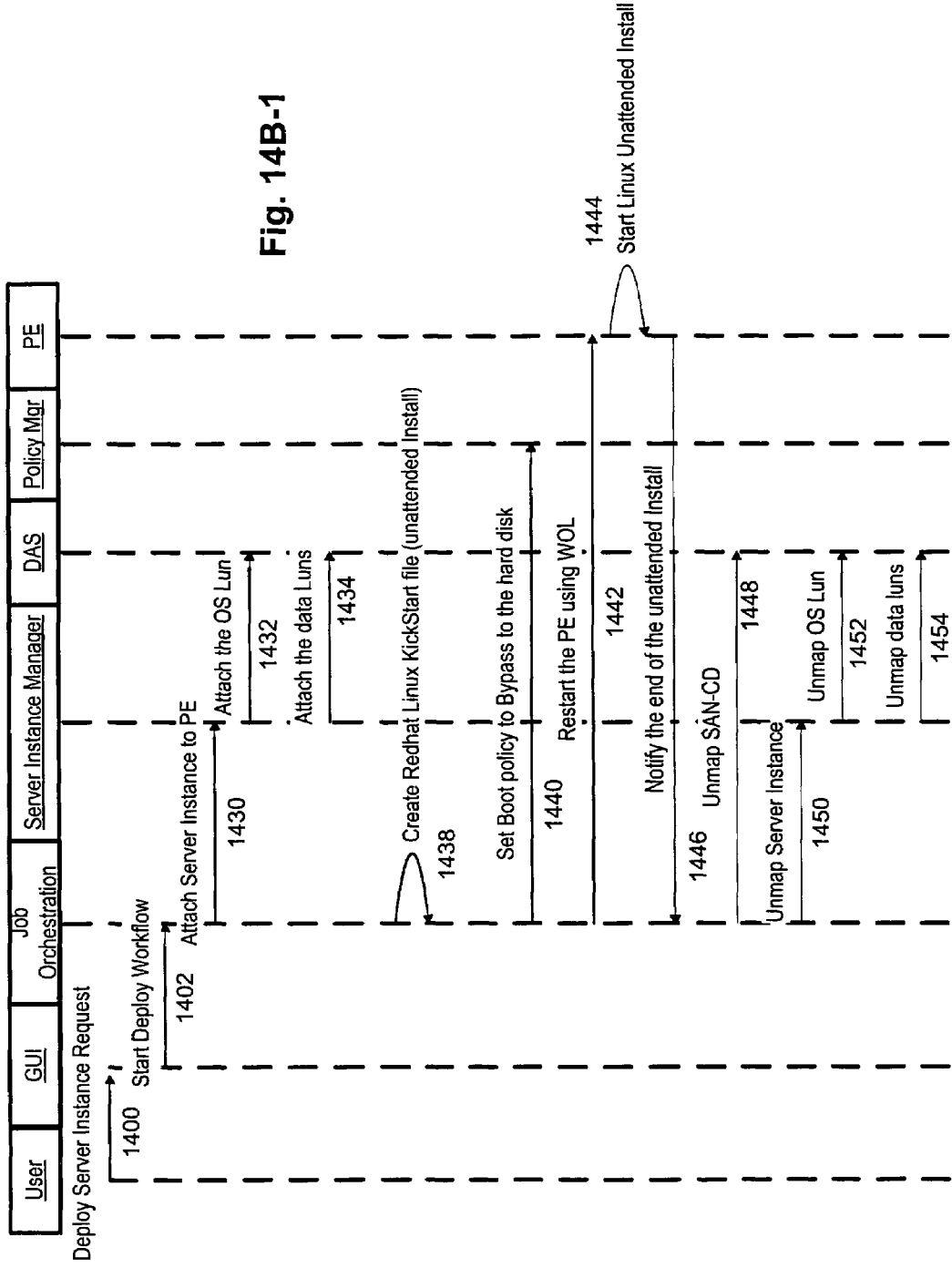
Figures 2, 14B:
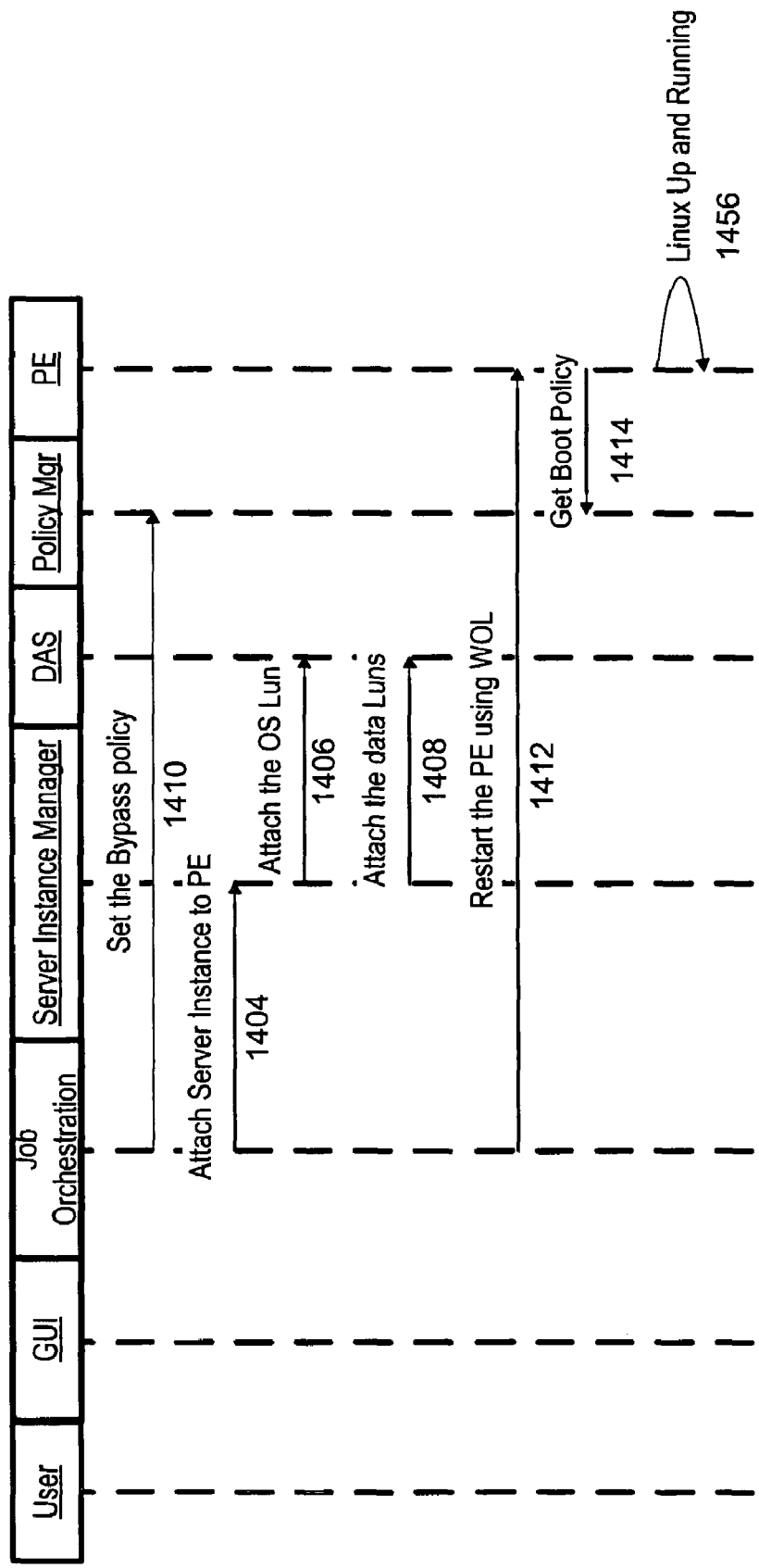
Figure 15:
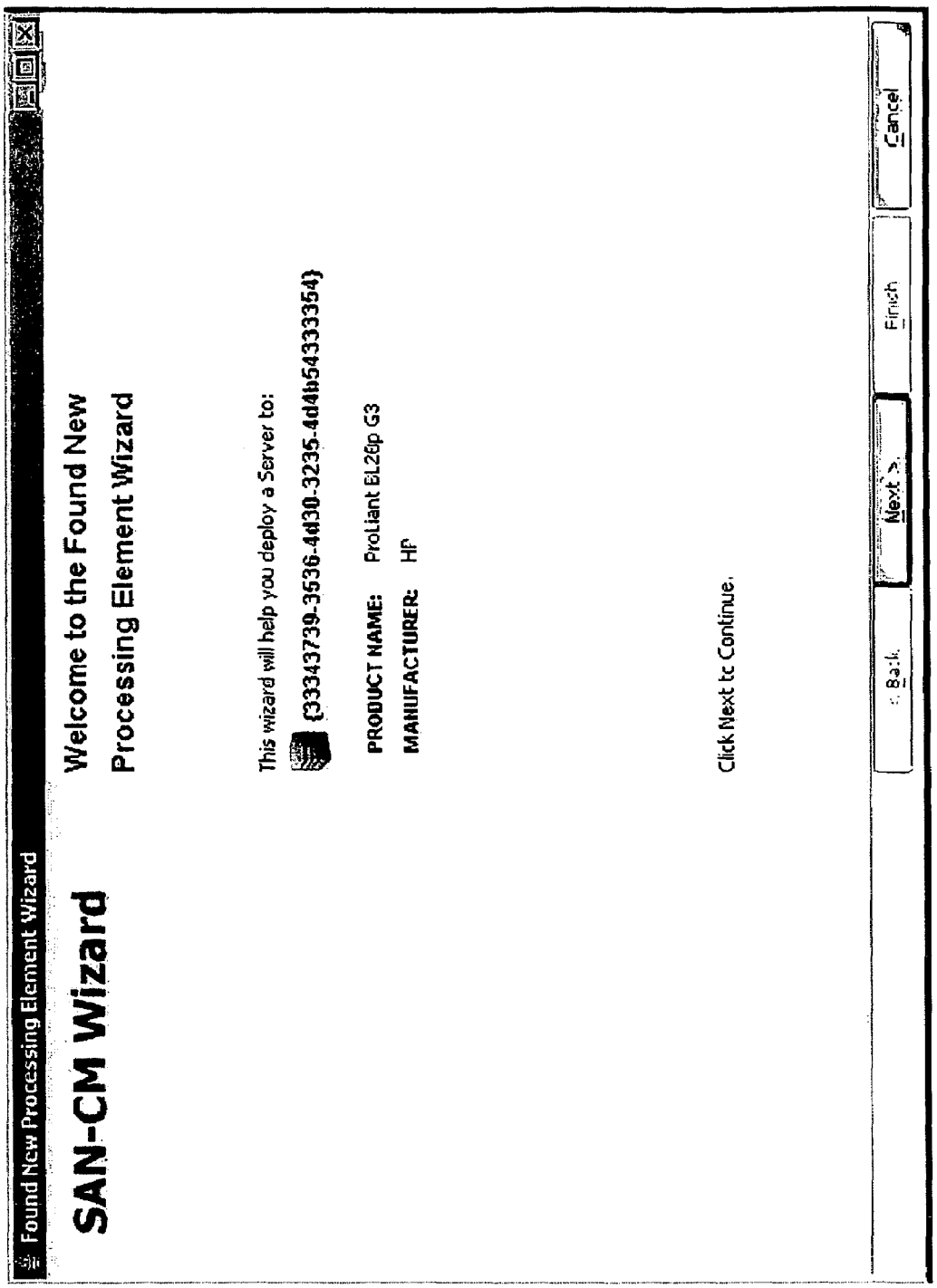
FIG. 15 is a screen shot of a wizard for deploying a server instance to a new processing element according to the present invention.
Figure 17:
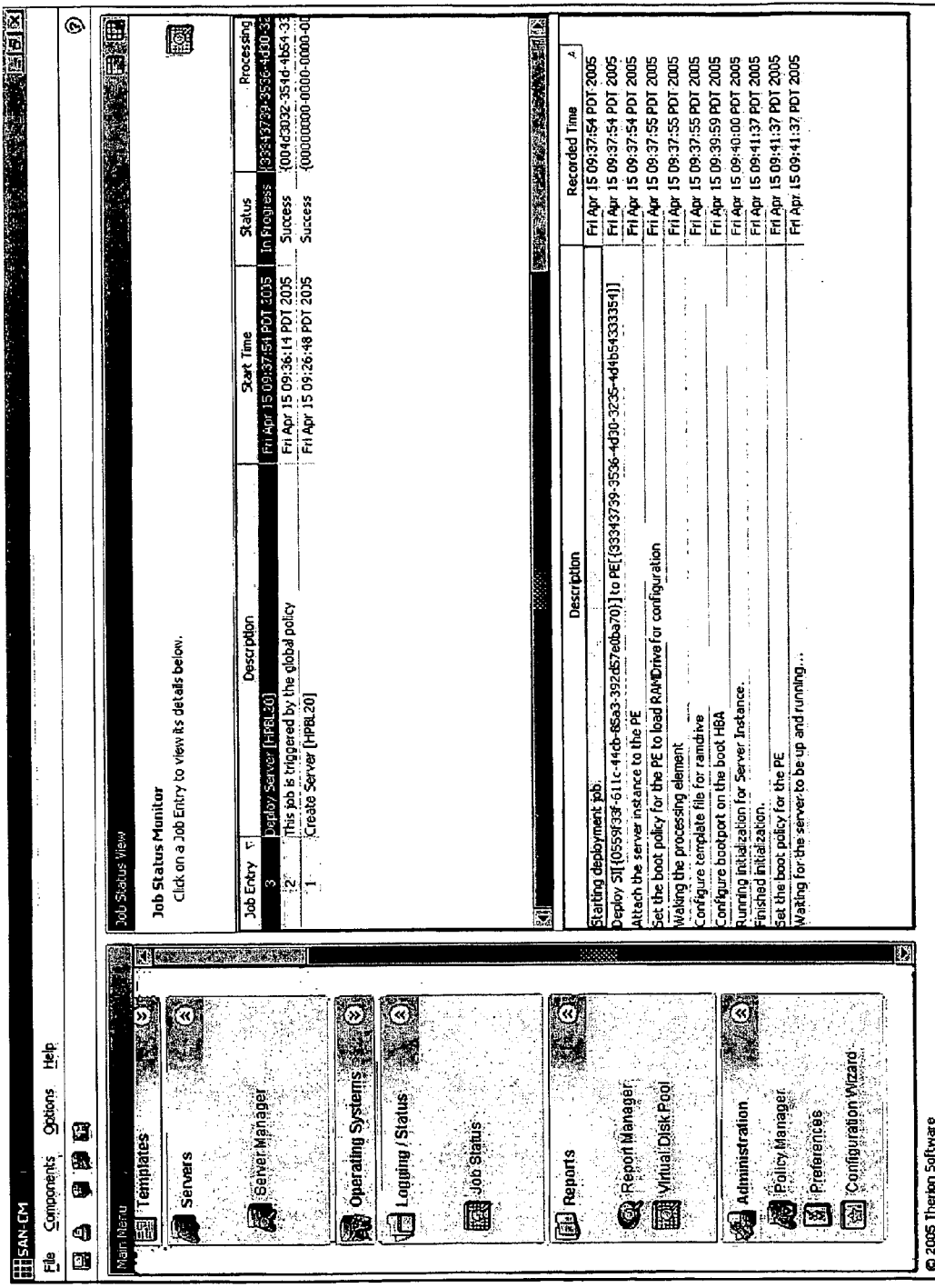
FIG. 17 is a screen shot indicating various operations in deploying a server instance to a physical processing element.

FIG. 15 is a screen shot that appears when a new processing element 210 has been determined to be on the network. While the deployment steps described above presumed the processing element 210 was known, in this instance the processing element 210 was not previously known. This determination can be done because the management service processor 404 is the PXE server on the subnet and therefore will be able to check the meta-data repository 590 for any previous asset information, such as the MAC address. Alternatively, the presence of the new processing element 210 may be detected from RSCN messages provided over the SAN fabric when the processing element 210 is powered on. If it is an unknown processing element 210, then a new unit has been added and the screen in FIG. 15 appears. FIG. 16 illustrates the next operation, which is the selection of the particular server instance 200 to be attached to this processing element 210. One is selected from the list of FIG. 16 and then FIG. 17 shows the various steps which then occur. Effectively these are steps 2 to 7 as shown in FIG. 14. The processing element 210 is properly set for booting and then is awakened as FIG. 14 step 9.

Figure 18:
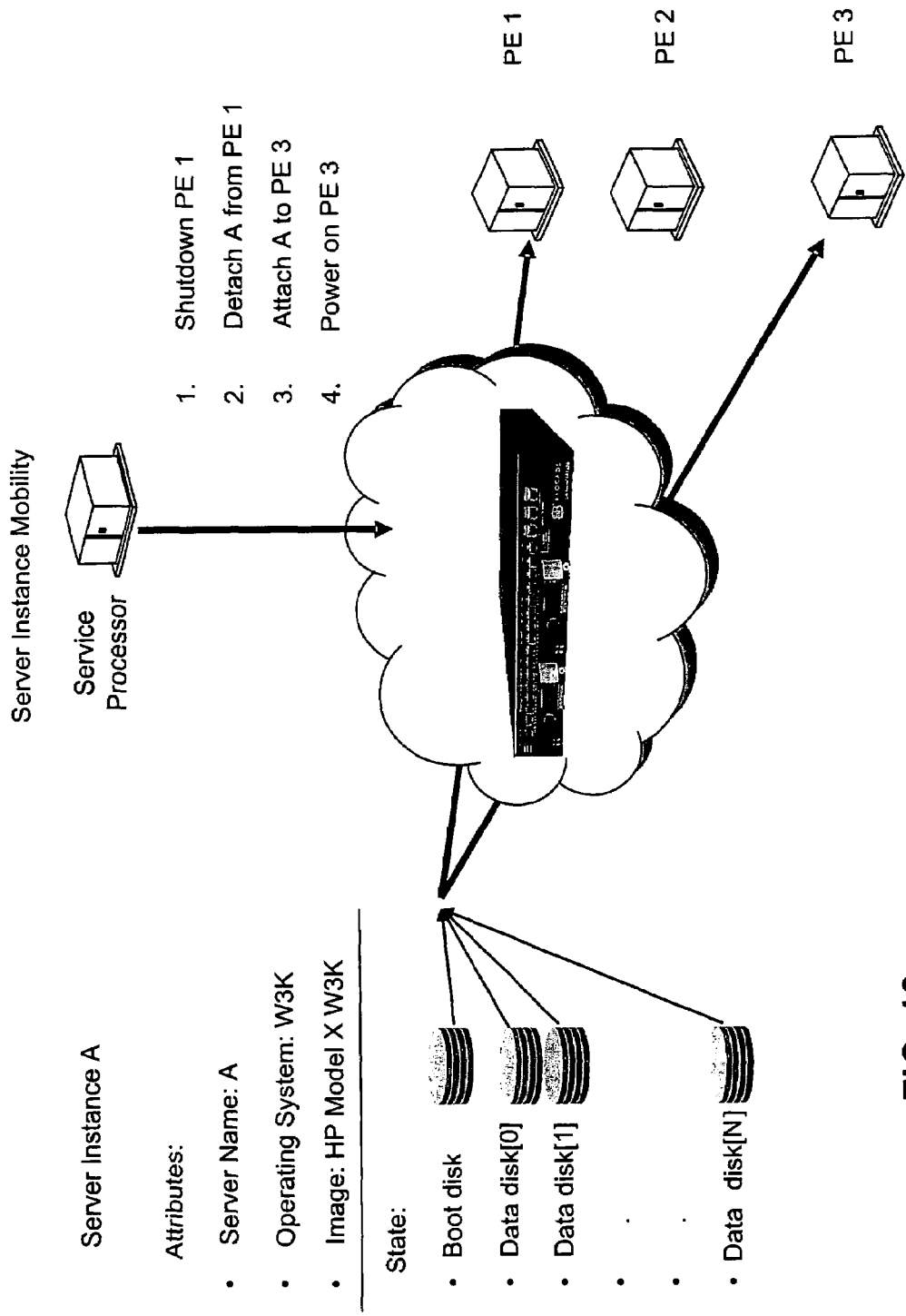
FIG. 18 is an illustration indicating the operations for transferring a server instance from one processing element to another according to the present invention.
Figure 19:
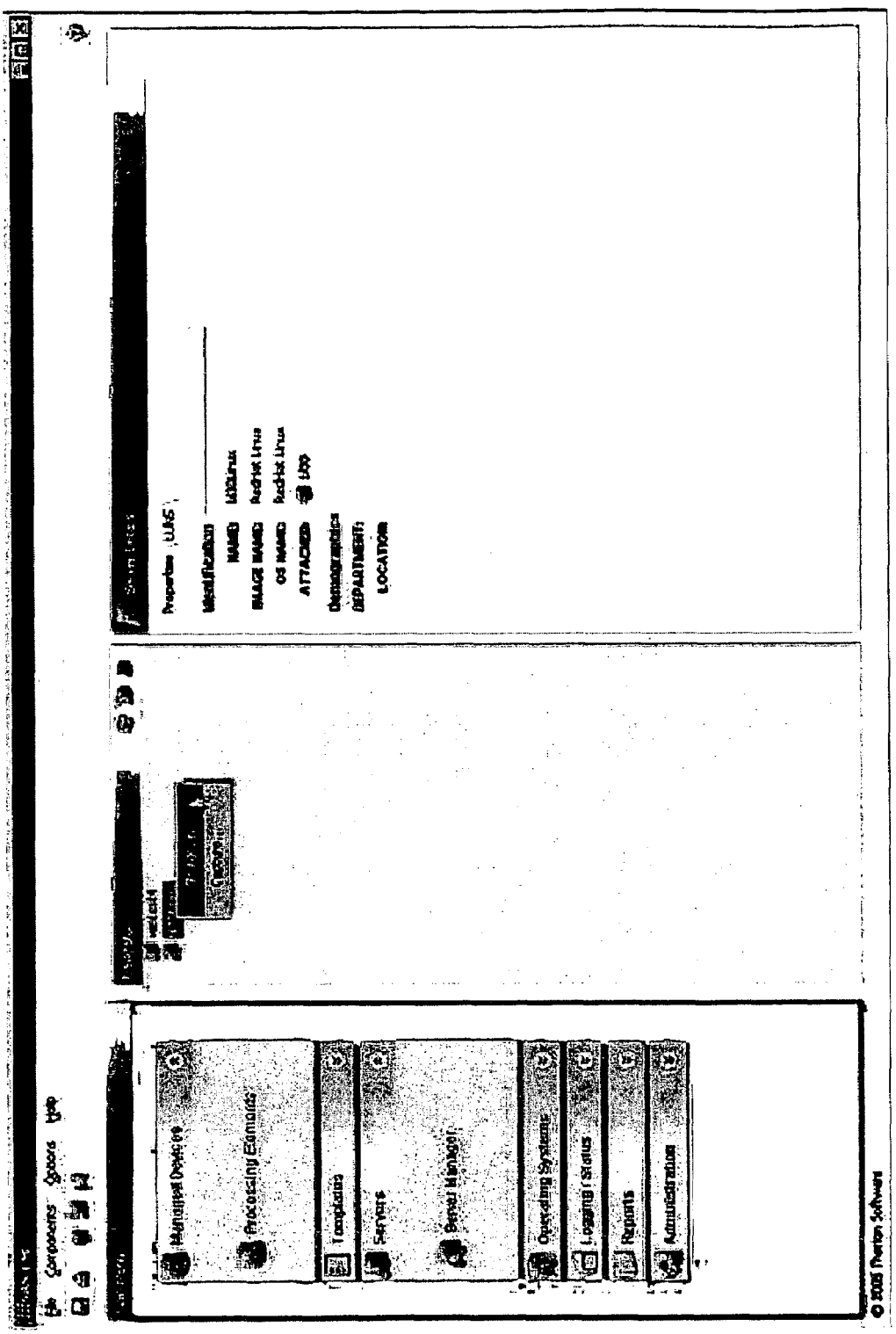
FIG. 19 is a screen shot of a first of the operations of FIG. 18.
Figure 20:
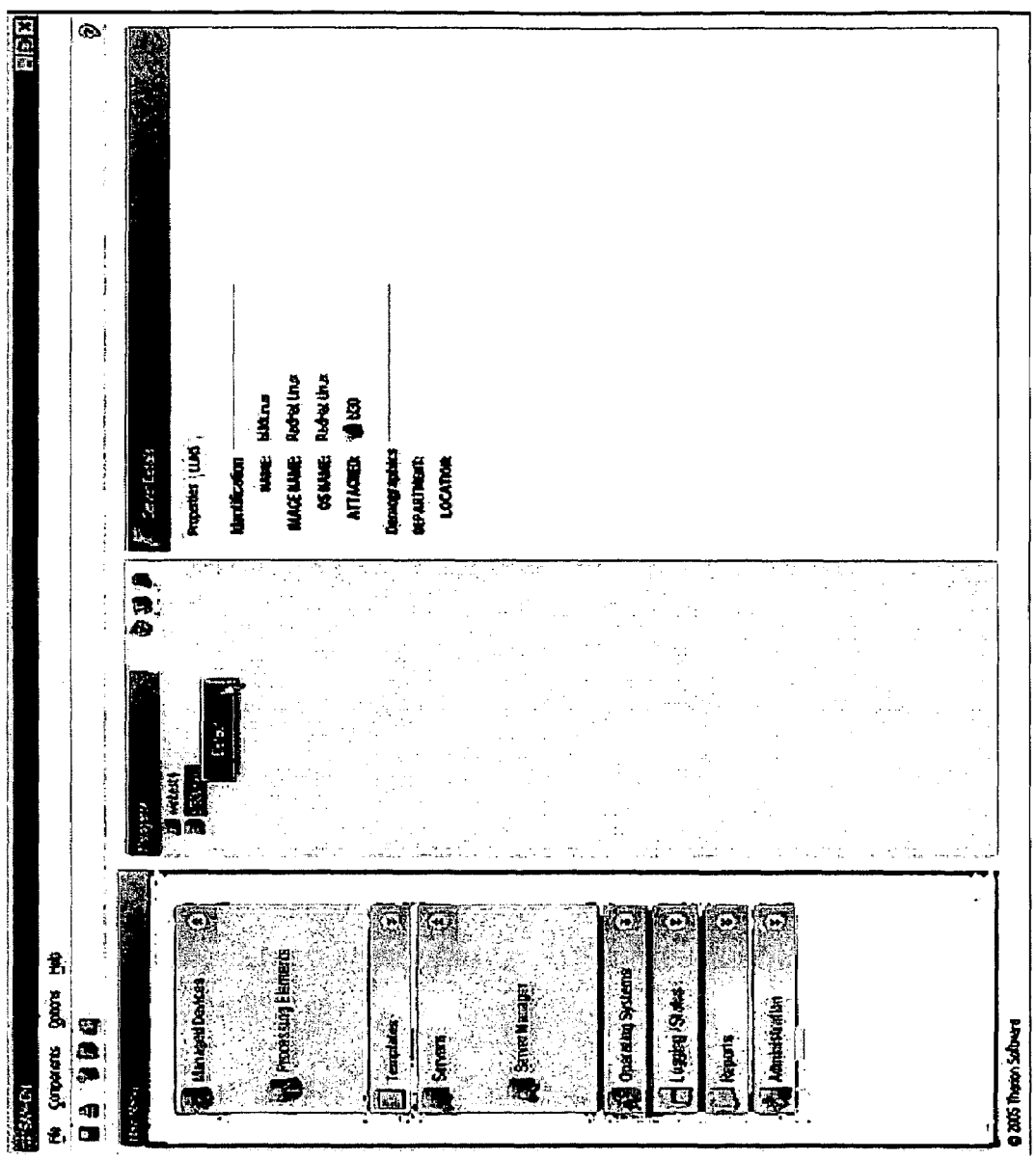
FIG. 20 is a screen shot of the second of the operations of FIG. 18.
Figure 21:
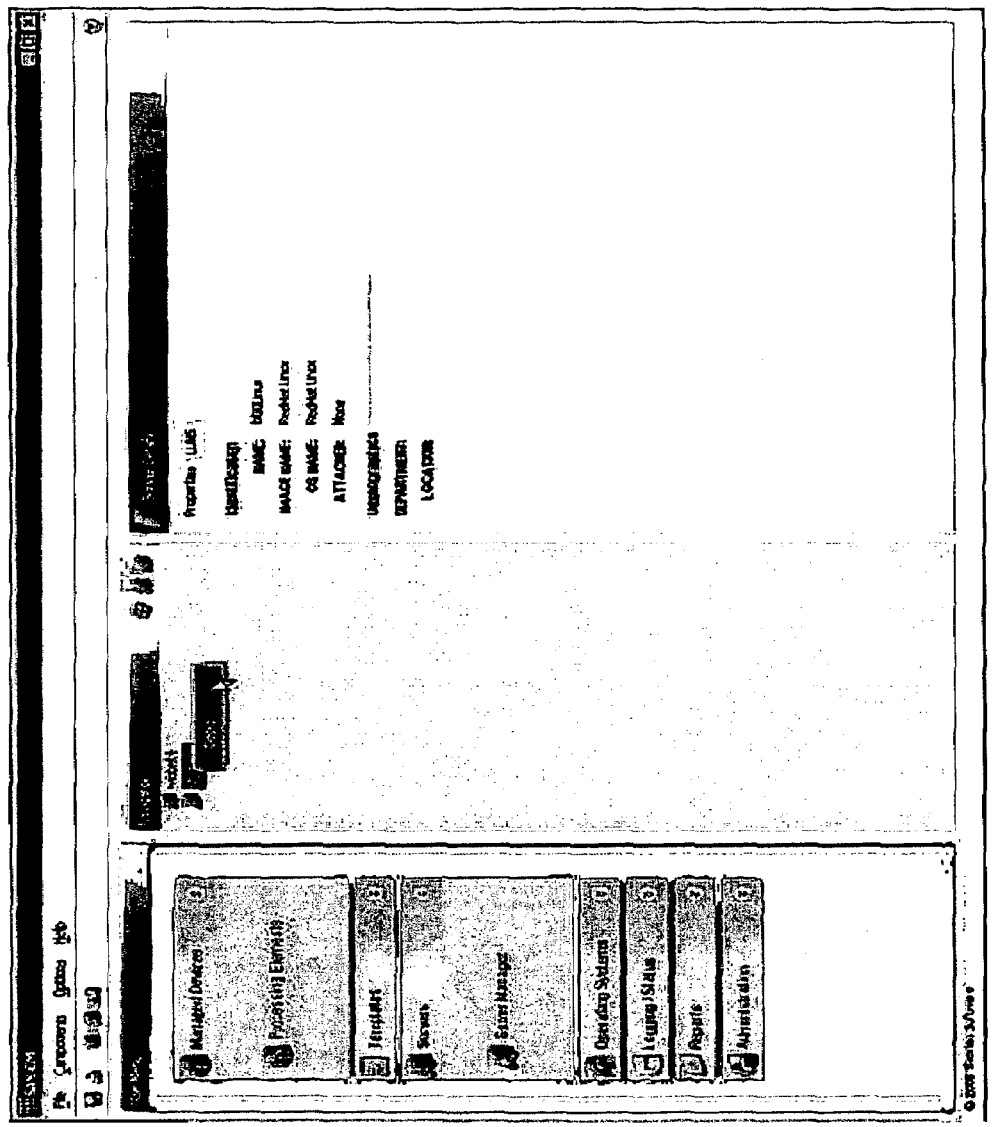
FIG. 21 is a screen shot of the third of the operations according to FIG. 18.
Figure 22:
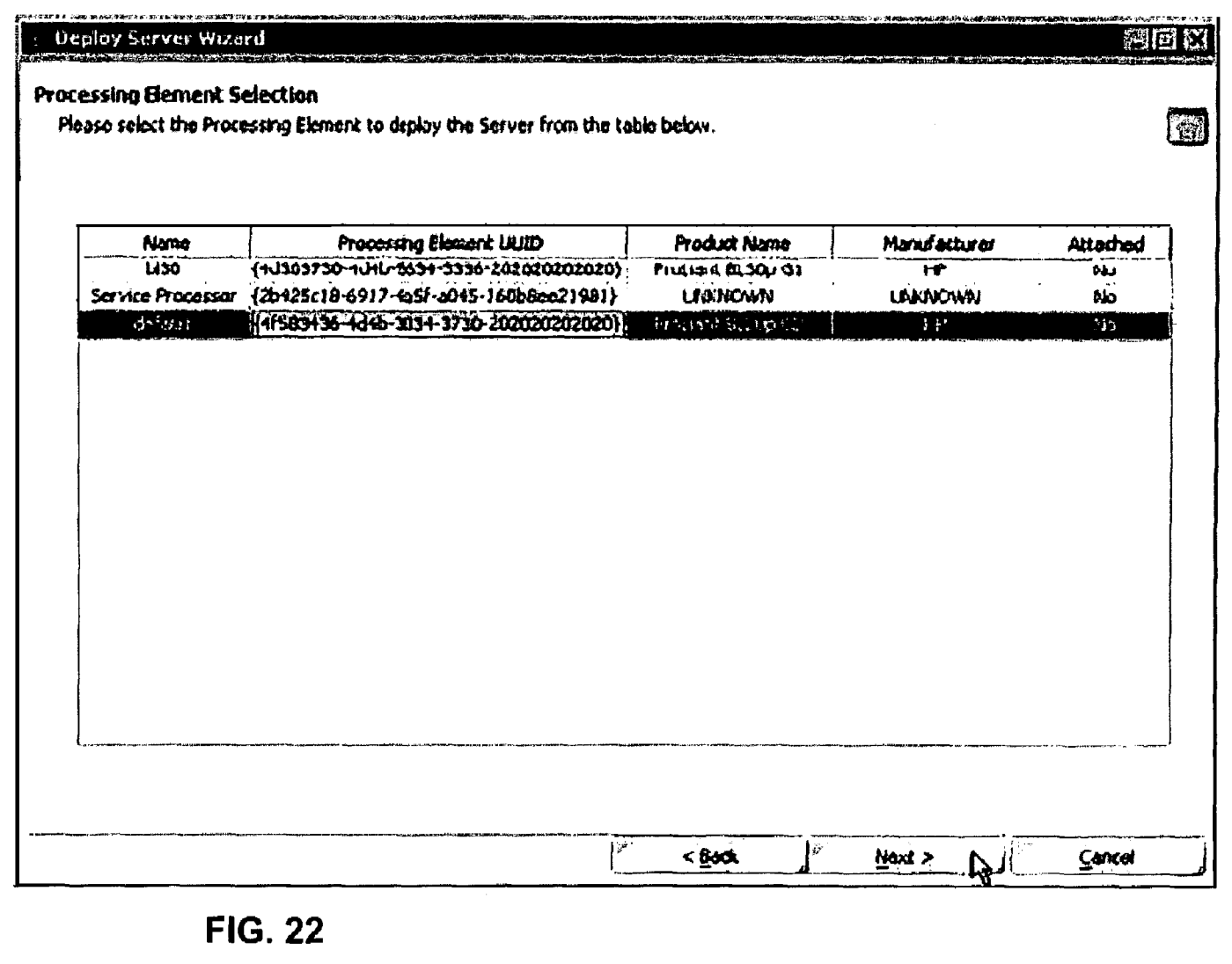

With the segregation into server instances and processing elements, it is very simple to move a server instance from one processing element to another processing element. This occurs as shown in FIG. 18. In step 1 the processing element is remotely shutdown. In step 2 the server instance A is detached for the processing element 1 simply by making appropriate table entries and undoing the various zoning and mapping steps. The server instance A is then attached to processing element 3 in the indicated example by making database entries and mapping changes and providing zoning information. Then in step 3 processing element 3 is powered on. In step 4, when it powers up, processing element 3 will try to boot from LUN0 which will then be server instance A. This presumes that processing element 3 has had its HBA properly configured to boot from LUN0 and the mapping is done as necessary to identify the OS image in server instance A as LUN0. Thus it is very simple and straightforward to transfer a server instance, i.e., an operating environment, from one processing element to another. This allows simple fail-over and replacement of processing capability in an enterprise environment. The process may even be automated. By monitoring RSCN messages the management service processor 404 can determine that a processing element has lost its SAN connection. If the server instance is only from the SAN, then it has clearly failed. The management service processor 404 can then select an equivalent processing element from an available pool and automatically transfer the server instance. The screen shots of the steps are shown in FIG. 19 where the processing element is shut down, FIG. 20 where the server instance is detached, FIG. 21 where it is deployed or attached to the new processing element and then FIG. 22 where the particular processing element is selected.

Figure 23:
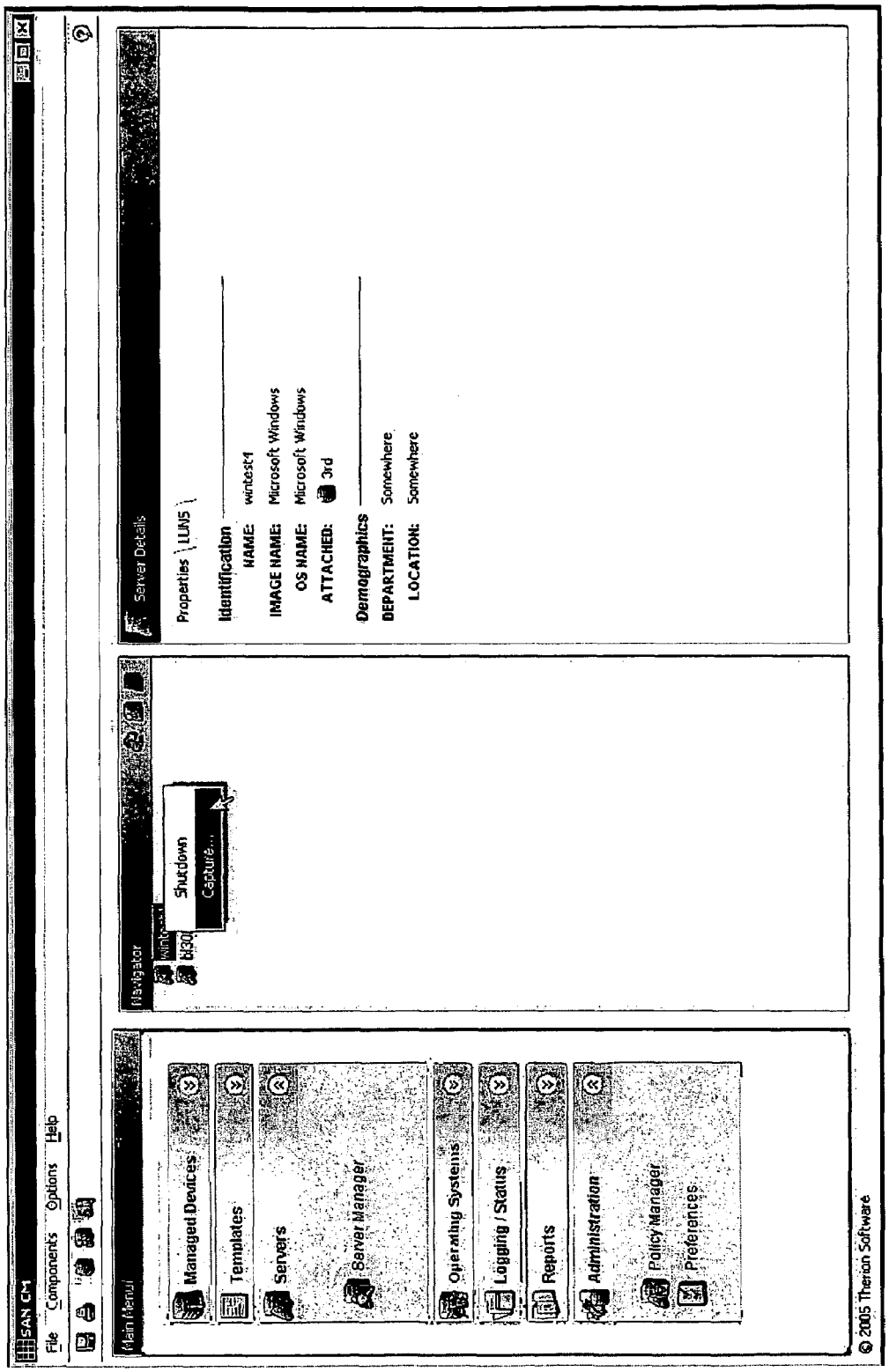
FIG. 23 is a screen shot indicating capturing of an operating system image according to the present invention.

One of the useful features according to the present inventions is golden image operating system capture. Preferably various embodiments automate this process. A master golden image for each particular server type such as an Exchange server, an Oracle server, a Linux file server, and so on, are developed using conventional techniques. Then relevant software such as sysprep from Microsoft or System Configurator for Linux available at http://systemconfig.sourceforge.net is executed to allow the particular image to be depersonalized. This golden image is captured and then appropriately stored in a designated LUN which can be later accessed and copied as desired. FIG. 23 illustrates the screenshot used to start this process.

Figure 24:
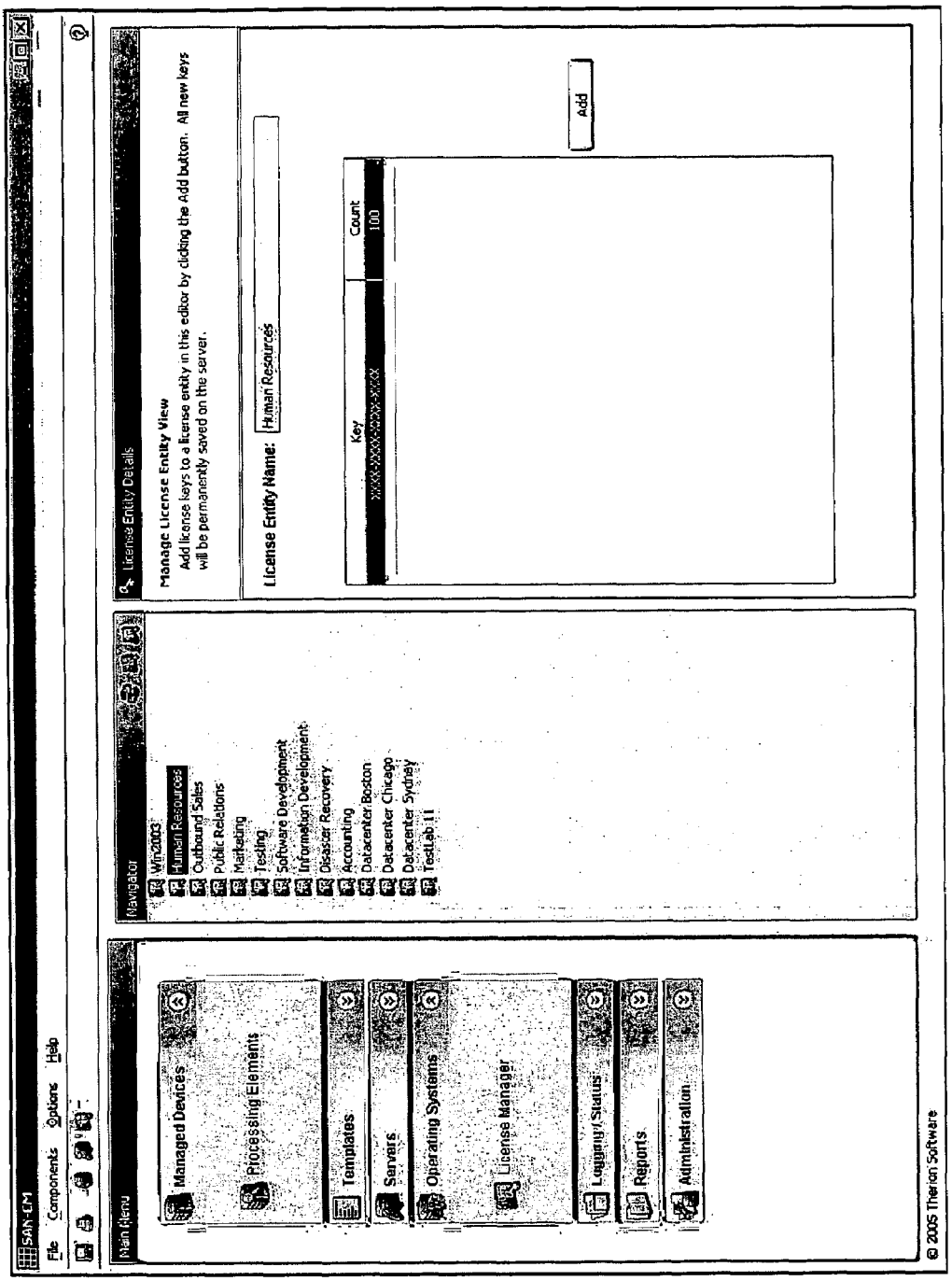
FIG. 24 is a screen shot of license key management according to the present invention.

As noted above, because the management service processor 404 is the element which handles deployment of the operating systems and in many cases also the applications, it is appropriate for it to perform license management. Therefore, as shown in FIG. 24, license keys can be entered to provide license entities which can then be utilized as shown above when server instances are created and ultimately deployed. The management service processor 404 then tracks the keys in the meta-data repository 590 using the license manager 512.

The above operations were described for server instance deployment models 3 and 4 where booting is done from a SAN LUN and the data resides on the SAN. The operations are slightly different for models 1 and 2. For model 2, instead of having the mini-OS environment set the HBA for booting from LUN0, the environment can contain sufficient drivers to obtain the operating system golden image from the proper SAN LUN and copy it to the directly attached storage. Then, instead of doing booting from the SAN, the processing element boots from its directly attached storage, with the data disks still being attached and mapped as in the above descriptions.

Model 1 operation is slightly different. Instead of providing the OS image over the SAN as in model 2, it is provided over the LAN from a known file location. As no data LUNs on the SAN are used in model 1, the attachment and mapping operations described above are also not necessary. Thus, after the OS image is copied to the processing element in a model 1 situation, the processing element can simply be turned off and then restarted, booting to its directly attached storage.

As described above, each server instance includes its own OS image. In large installations this can result in a large amount of storage being allocated to essentially identical images. To address this problem, certain embodiments may employ the virtualization component 402 and provide a policy that the OS image is in a copy-on-write (COW) LUN.

In those cases, should the processing element attempt to write to the OS image, the virtualization component 402 will trap those writes and redirect them transparently to a new LUN assigned to that processing element. When the processing element later tries to read that information, the virtualization component 402 will determine that this data has been written to the new LUN and will provide the requested data from the new LUN, rather than from the OS image LUN. In this manner many different processing elements will be able to share the same OS image and yet still be able to perform any necessary personalization operations without overwriting the shared OS image. This capability will greatly reduce the needed OS image storage requirements.

Snapshoting is a well known process to capture data at selected intervals. However, in the past snapshoting has only been performed on data. The operating system image was not contained in any snapshot. Thus, to perform a restoration of the system to the time of the snapshot required building the operating system in conventional fashion and then doing the restore. With the concept of server instances where the operating system as well as the data is maintained as LUNs on the SAN, the snapshot operation can be configured to capture the OS image as well as the data. Then a restoration is very simply performed by defining the snapshot as the relevant LUNs for the server instance so that a restore operation is extremely efficient and quick.

The above description has attempted to be generic as to the SAN fabric. As noted, the SAN can be Fibre Channel or iSCSI or a combination. The above description has been based on a Fibre Channel SAN, so certain operations may need to be altered for iSCSI operation, but those changes are apparent to one skilled in the art.

LUN is used to refer to information needed to properly address the designated storage area. Therefore in this description a LUN may include a WWN and a SCSI LUN in Fibre Channel cases, an IP address and a SCSI LUN in iSCSI cases, SCSI LUNs for directly attached storage and other variations as necessary to fully address a storage area.

Assignment of data LUNs has been described as being done from an available pool. For certain environments, particularly clusters, the data LUNs should be shared among the various deployed servers in the cluster. The disk allocation service can be adapted to provide for this data LUN sharing by providing additional options during template operations.

While illustrative embodiments of the invention have been illustrated and described, it will be appreciated that various changes can be made therein without departing from the spirit and scope of the invention.

The invention claimed is:

1. A method for defining a server comprising:
   providing a server graphical user interface having a plurality of data entry fields, the server graphical user interface data entry fields used in defining the server and including:
      a template name field that references a server template;
      an operating system field; and
      a storage template field that references a first storage template; and
   storing the data entry provided into the plurality of server graphical user interface data entry fields;
   wherein the storage template field is a drop down field and the available entries are determined by including the steps:
      providing a storage graphical user interface having a plurality of data entry fields, the storage graphical user interface data entry fields used in defining a storage unit and including:
         a template name field that references a second storage template; and
         a size field; and
      storing data entry provided into the plurality of storage graphical user interface data entry fields, and
   wherein the server graphical user interface data entry fields further include an operating system size field.

2. The method of claim 1, wherein the storage graphical user interface data entry fields further include a level layout field used in defining a level of data integrity of the storage unit.

3. The method of claim 1, wherein the storage graphical user interface data entry fields further include a cost field.

4. The method of claim 1, wherein the server graphical user interface data entry fields further include an operating system lay out field used in defining a level of data integrity of a storage unit associated with the operating system.

5. The method of claim 1, wherein the server graphical user interface data entry fields further include an operating system storage cost field.

6. The method of claim 1, wherein the server graphical user interface data entry fields further include:
   a template choice field; and
   a server name field.

7. The method of claim 6, wherein the server graphical user interface data entry fields further include: a domain field; an administrator field; and a password field.

8. A machine readable storage medium having embodied there upon instructions executable by a machine to perform the following method steps for defining a server:
   providing a server graphical user interface having a plurality of data entry fields, the data entry fields used in defining the server and including:
      a template name field that references a server template;
      an operating system field; and
      a storage template field that references a first storage template; and
   storing the data entry provided into the plurality of server graphical user interface data entry fields;
   wherein the storage template field is a drop down field and the available entries are determined by including the steps:
      providing a storage graphical user interface having a plurality of data entry fields, the storage graphical user interface data entry fields used in defining a storage unit and including:
         a template name field that references a second storage template;
         a size field; and
      storing the data entry provided into the plurality of storage graphical user interface data entry fields, and
   wherein the server graphical user interface data entry fields further include an operating system size field.

9. The machine readable storage medium of claim 8, wherein the storage graphical user interface data entry fields further include a level layout field used in defining a level of data integrity of the storage unit.

10. The machine readable storage medium of claim 8, wherein the storage graphical user interface data entry fields further include a cost field.

11. The machine readable storage medium of claim 8, wherein the server graphical user interface data entry fields further include an operating system layout field used in defining a level of data integrity of a storage trait associated with the operating system.

12. The machine readable storage medium of claim 8, wherein the server graphical user interface data entry fields further include an operating system storage cost field.

13. The machine readable storage medium of claim 8, wherein the server graphical user interface data entry fields further include:
- a template choice field; and
- a server name field.

14. The machine readable storage medium of claim 13, wherein the server graphical user interface data entry fields further include:
- a domain field;
- an administrator field; and
- a password field.

15. The method of claim 1, wherein the first and second storage templates are the same template.

16. The machine readable storage medium of claim 8, wherein the first and second storage templates are the same template.

* * * * *

UNITED STATES PATENT AND TRADEMARK OFFICE
CERTIFICATE OF CORRECTION

PATENT NO. : 7,590,648 B2  Page 1 of 1
APPLICATION NO. : 11/140577
DATED : September 15, 2009
INVENTOR(S) : Vinod R. Shankar et al.

It is certified that error appears in the above-identified patent and that said Letters Patent is hereby corrected as shown below:

At column 14, line 32:
  Please replace "the data entry fields used" with --the server graphical user interface data entry fields used--
At column 14, line 58:
  Please replace "a level layout field" with --a layout field--

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,590,648 B2
APPLICATION NO. : 11/140577
DATED : September 15, 2009
INVENTOR(S) : Shankar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 732 days.

Signed and Sealed this

Fourteenth Day of December, 2010

David J. Kappos
*Director of the United States Patent and Trademark Office*